US006963383B2

(12) United States Patent
Tokailin et al.

(10) Patent No.: US 6,963,383 B2
(45) Date of Patent: *Nov. 8, 2005

(54) ELECTRODE SUBSTRATE AND PRODUCTION METHOD THEREOF

(75) Inventors: Hiroshi Tokailin, Sodegaura (JP);
Yoshikazu Nagasaki, Sodegaura (JP);
Tadao Shibuya, Sodegaura (JP);
Kazuyoshi Inoue, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 10/460,677

(22) Filed: Jun. 13, 2003

(65) Prior Publication Data

US 2004/0066484 A1 Apr. 8, 2004

(51) Int. Cl.⁷ .............................................. G02F 1/1343
(52) U.S. Cl. ....................... 349/143; 428/690; 428/917; 204/192.1

(58) Field of Search .................................. 428/690, 917; 427/66, 58, 402, 419.1; 313/504, 506; 204/192.1, 192.15, 192.2; 349/143

(56) References Cited

FOREIGN PATENT DOCUMENTS

| JP | 11-126689 | 5/1999 |
|----|-----------|--------|
| JP | 11-133447 | 5/1999 |
| JP | 11-295747 | 10/1999 |
| JP | 11-305248 | 11/1999 |

*Primary Examiner*—Toan Ton
(74) *Attorney, Agent, or Firm*—Steptoe & Johnson LLP

(57) ABSTRACT

An electrode substrate comprising; an electrode comprising a compound containing an In atom and a substrate body, wherein a half band width ratio $[In3d_{5/2}]_h/[In3d_{5/2}]_n$ is from 0.9 to 1.2 wherein $[In3d_{5/2}]_h$ is a half band width of a $3d_{5/2}$ orbit spectral peak of an In atom in the surface of the electrode, and $[In3d_{5/2}]_n$ is a half band width of a $3d_{5/2}$ orbit spectral peak of an In atom in the interior of the electrode, the spectral peaks being measured by X-ray photoelectron spectroscopy: and the method for the production thereof.

14 Claims, 16 Drawing Sheets

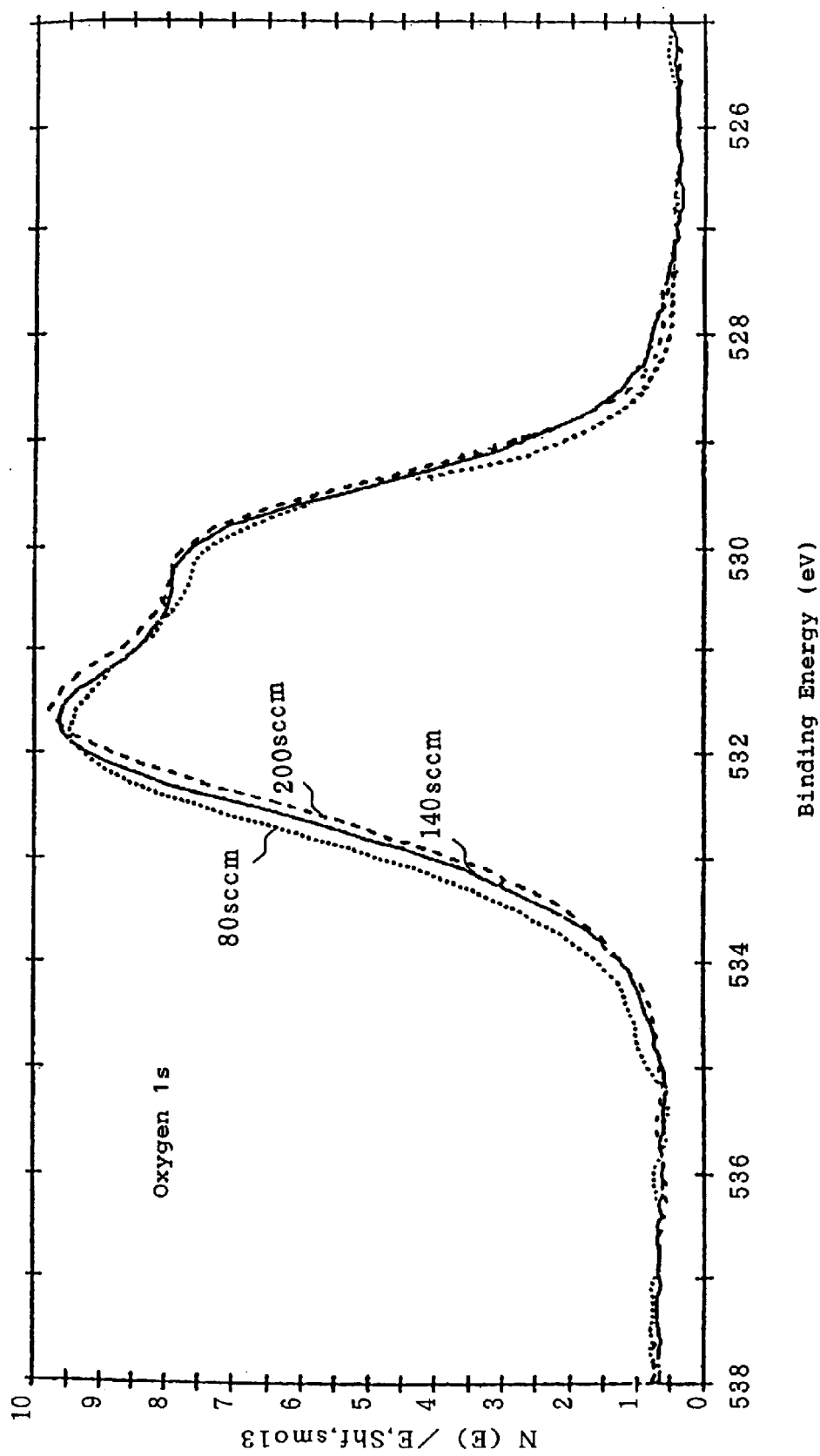

ELECTRODE SUBSTRATE AND PRODUCTION METHOD THEREOF

BACKGROUND OF THE INVENTION

1. Field of the Invention

The invention relates to an electrode substrate and a producing method thereof, particularly an electrode substrate with an excellent electrical stability used for liquid-crystal display elements, organic electro-luminescence elements (organic EL elements) and the like and a producing method thereof.

2. Description of the Background

Conventionally cathode ray tubes (CRT) have been generally used as a display means. However liquid-crystal display elements, which have advantages such as thin type, light weight and energy saving, have been practically used and widely used in personal computers and the like.

Display means of spontaneous self-emitting type such as organic EL elements, inorganic EL elements and plasma displays have been researched and developed as a display means of next generation in place of CRTs.

These display means has demanded an electrode substrate with an excellent electrical stability that enables the driving by low voltage for a long period of time.

For example, Japanese Patent Kokai No. 11-295747 proposes a liquid-crystal display element in which a resist mask for etching remains as it is in stripe electrodes made of an ITO film on a transparent substrate.

The object of the electrode substrate is to prevent the occurrence of display defects due to disconnection by protecting the ITO film, which is a transparent electrode. However, the surface state of electrode has not been considered and its electrical stability cannot be sufficiently improved.

Japanese Patent Kokai No. 11-305248 proposes a liquid-crystal display element of refection and transmission combined type that has a transmission electrode part and reflection electrode part on pixel electrodes on a transparent substrate. The transmission electrode part is made of a transparent electrode film such as ITO. The reflection electrode part is made of a reflective electrode film such as Al.

The object of the reflection electrode part is to prevent the reduction of contrast and improve the visibility in both transmission and reflection modes. However, the surface state of electrode has not been considered and its electrical stability cannot be sufficiently improved.

Japanese Patent Kokai No. 11-133447 proposes an electrode substrate in which an ITO film is formed on a surface of a transparent substrate. The transparent substrate has a refractive index of 1.4 to 1.6. The ITO film has a refractive index of 1.65 to 1.95 in the visible light band and an optical film thickness of about $\lambda/2$ times the wavelength of light source beam used.

This electrode substrate can prevent reflection for light of a wide wavelength region. However, the surface state of electrode has not been considered and its electrical stability cannot be sufficiently improved.

Japanese Patent Kokai No. 11-126689 proposes an electrode substrate obtained by subjecting a substrate used for an organic EL element to inverse sputtering by a RF sputtering device before the formation of a transparent electrode film so that the maximum surface roughness of the substrate is smaller than 15 nm and the average roughness is smaller than 10 nm.

The document teaches that the preferred distance between the substrate and target is form 4 to 15 cm in this method, since an ordinary RF sputtering device is used in inverse sputtering.

The object of the electrode substrate of Japanese Patent Kokai No. 11-126689 is to improve the surface roughness of substrate and therefore the electrical connection on an electrode formed on a substrate. However the composition and the binding state of atoms in the surface of electrode are not considered. Thus, when driving the organic EL element for a long period of time, the driving voltage excessively increases so that the electrical stability cannot be sufficiently improved.

In addition, the distance between the substrate and target is narrow, since an ordinary RF sputtering device is used. As a result, it is difficult to change the conditions of inverse sputtering.

Therefore, in order to solve the above problems, objects of the present invention are to provide an electrode substrate with an excellent electrical stability by associating the surface composition of electrode with its interior composition; reduce surface defects by improving an electrode itself by inverse sputtering and the like; and specifically provide a method for efficiently producing electrode substrates with an excellent electrical stability while reducing surface defects in the electrode surface.

SUMMARY OF THE INVENTION

According to the present invention, there is provided an electrode substrate comprising an electrode comprising a compound containing an In atom and a substrate body, wherein a half band width ratio $[In3d_{5/2}]_h/[In3d_{5/2}]_n$ is from 0.9 to 1.2 wherein $[In3d_{5/2}]_h$ is a half band width of a $3d_{5/2}$ orbit spectral peak of an In atom in the surface of the electrode, and $[In3d_{5/2}]_n$ is a half band width of a $3d_{5/2}$ orbit spectral peak of an In atom in the interior of the electrode, the spectral peaks being measured by X-ray photoelectron spectroscopy (XPS). This electrode substrate can solve the problem described above.

By limiting the ratio of half band widths $[In3d_{5/2}]$ of $In3d_{5/2}$ orbit spectral peaks in the surface and the interior of electrode, the existence rate of surface defects can be reduced. As a result, an electrode substrate with an excellent electrical stability can be provided. Thus, for example, in case that this electrode substrate is used in an organic EL element and the electrode of electrode substrate is used as an anode, the increase in driving voltage can be suppressed to 1 V or lower, even if this element is driven for 2000 hours or longer.

In the electrode substrate of the present invention, an area ratio $S_B/S_A$ preferably satisfies the following formula:

$$S_B/S_A < 0.3$$

wherein $S_A$ is the area of a peak A that is a peak of an oxygen 1s orbit with a binding energy of 530±0.5 eV in the surface of the electrode and $S_B$ is the area of a peak B that is a peak of an oxygen 1s orbit with a binding energy of 532±1.0 eV in the surface of the electrode, the peaks being measured by XPS.

By remarking the oxygen 1s orbit peaks of the surface and the interior of electrode, the existence rate of surface defects can be further reduced, and an electrode substrate with a more excellent electrical stability can be provided.

In the electrode substrate of the present invention, a constituent material of the substrate body and/or the electrode is preferably a transparent material.

According to this electrode substrate, there can be provided the electrode substrate with an excellent electrical stability and transparency suitable for use in EL display elements and liquid-crystal display elements.

In the electrode substrate of the present invention, a surface protection film comprising an inorganic compound is preferably formed on the surface of the electrode.

According to this electrode substrate, after surface defects of electrode surface has been decreased by inverse sputtering etc, the generation of surface defects on electrode surface again by oxygen and water of an atmosphere can be prevented effectively.

In the electrode substrate of the present invention, the inorganic compound forming the surface protection film is preferably an oxide containing a Ce atom.

According to this electrode substrate, a dense surface protection film can be formed on the electrode surface. Thus, the regeneration of surface defects on electrode surface can be more effectively prevented.

In the electrode substrate of the present invention, the thickness of the surface protection film is preferably from 5 Å to 100 Å.

According to this electrode substrate, the regeneration of surface defects on electrode surface can be effectively prevented and a certain light transmittance can be obtained.

In forming the surface protection layer of the present invention, the surface of the electrode is preferably subjected to inverse sputtering.

According to this electrode substrate, the surface defects in electrode surface can be effectively reduced, and the compositions of the interior and surface of electrode can be substantially the same. Thus, an electrode substrate with a more excellent electrical stability can be provided.

The "inverse sputtering" is defined as the surface processing which gives an impact to the surface of electrode of substrate using a sputter gas as ions generated by plasma. This inverse sputtering can be carried out by using a sputtering device and irradiating the sputter gas to the electrode substrate instead of a target.

In the electrode substrate of the present invention, the inverse sputtering is preferably carried out by inductively coupled RF plasma sputtering magnetron sputtering (ICMS).

According to this electrode substrate, the surface defects in electrode surface can be more effectively reduced, and the compositions of the interior and surface of electrode can be substantially the same. Thus, an electrode substrate with a more excellent electrical stability can be provided.

In the electrode substrate of the present invention, the electrode preferably comprises indium tin oxide (ITO) or indium zinc oxide (IZO).

Such a transparent electrode allows excellent heat resistance and light transmittance.

In the electrode substrate of the present invention, the electrode preferably comprises an amorphous oxide.

This construction allows the excellent etching properties.

Although the ITO as described above is generally crystalline, it can be an amorphous by forming a film in a moisture atmosphere or doping minute amounts of element.

The another embodiment of present invention is a method for producing an electrode substrate comprising a substrate body and an electrode comprising the steps of:

forming an electrode comprising an indium atom containing compound on a substrate body, and giving an inorganic compound to the surface of electrode formed.

According to this method, the existence rate of surface defects in the surface of electrode can be reduced, and an electrode substrate with an excellent electrical stability can be effectively provided.

In the method of the present invention, the surface protection film comprising an inorganic compound is preferably formed after the inverse sputtering is carried out or at the time when an inorganic compound is given in the step of forming the inorganic compound to the surface of the electrode.

According to this method, there can be effectively provided an electrode substrate in which the regeneration of surface defects in the surface of electrode is effectively prevented.

In the method of the present invention, the inverse sputtering is preferably carried out by inductively coupled RF plasma sputtering magnetron sputtering (ICMS).

According to this method, the existence rate of surface defects in the surface of electrode can be effectively reduced.

In the method of the present invention, the inverse sputtering is preferably carried out by applying power of 50 to 200 W and high-frequency waves of 13.56 to 100 MHz to a helical coil, applying power of 200 to 500 W and high-frequency waves of 13.56 to 100 MHz to a cathode for plasma discharge and making the strength of a magnetic field range from 200 to 300 gauss.

According to this method, the existence rate of surface defects in the surface of electrode can be more effectively reduced.

BRIEF DESCRIPTION OF THE DRAWINGS

FIG. 16 is a view showing oxygen 1s orbit spectral peaks in an ITO surface subjected to inverse sputtering by changing a flow amount of sputtering gas (oxygen partial pressure).

BEST MODE FOR CARRYING OUT THE INVENTION

[First Embodiment]

A first embodiment provides an electrode substrate comprising an electrode substrate comprising a compound containing an In atom and a substrate body wherein the ratio of the half band width $[In3d_{5/2}]_h$ of an $In3d_{5/2}$ orbit spectral peak measured by X-ray photoelectron spectroscopy (XPS) in the surface of anode to the half band width $[In3d_{5/2}]_n$ of an $In3d_{5/2}$ orbit spectral peak measured by XPS in the interior of the anode layer, $([In3d_{5/2}]_h/[In3d_{5/2}]_n)$, is from 0.9 to 1.2.

With reference to drawings, the electrode substrate according to the first embodiment will be concretely explained.

1. Substrate Body (1) Light Transmittance

Figure 1:
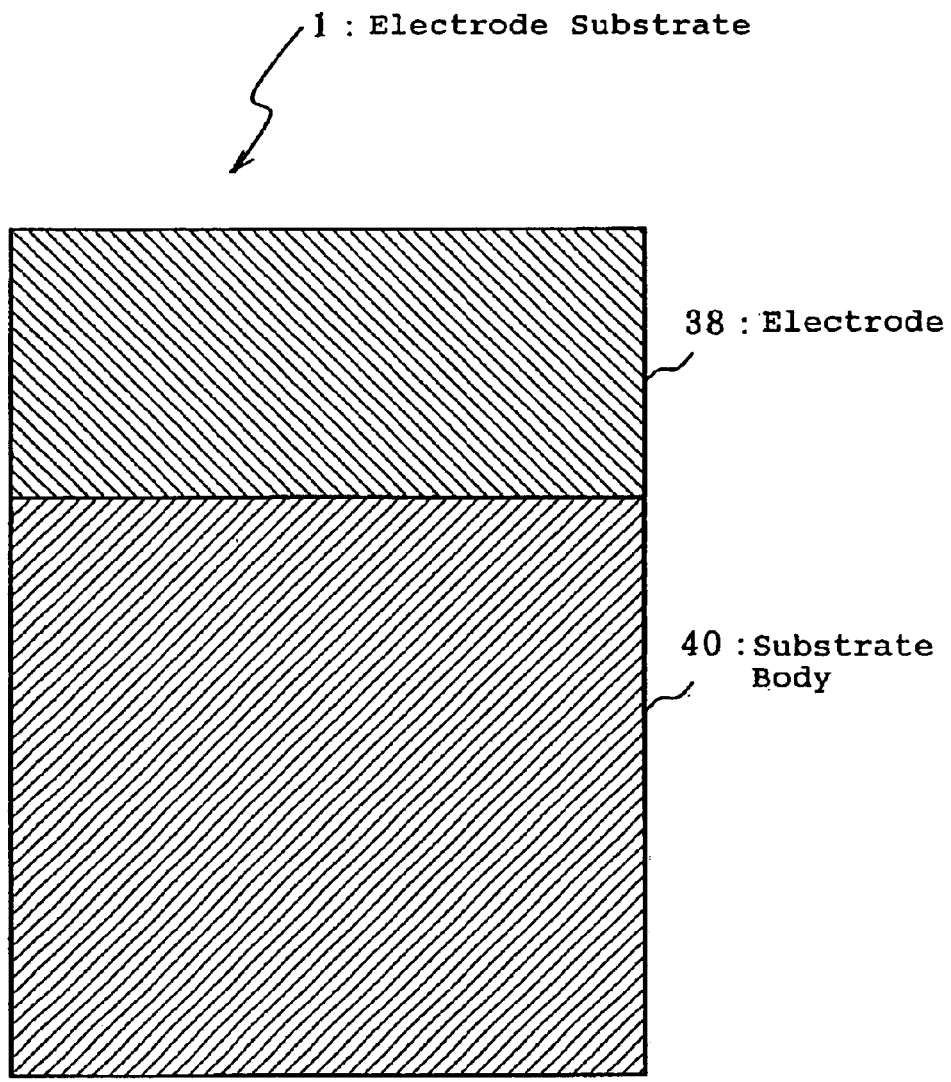
FIG. 1 is a diagrammatic sectional view for explaining the structure of electrode substrate of the present invention.

In an electrode substrate 1 shown in FIG. 1, a substrate body 40 is preferably made of a transparent material, because light transmitted from a transmission liquid-crystal display element, light emitted from an EL element and the like can be effectively taken to the outside.

Specifically the transparent material preferably has a light transmittance (substrate thickness: 1 mm) for visible light (wavelength 500 nm) of a 75% or more, more preferably 85% or more, further more preferably 95% or more.

(2) Constituent Material

Materials for a substrate body include glass plates made of soda lime, lead glass, borosilicate glass, high-purity silica glass and non-alkali glass. Of these glass plates, the non-alkali glass plates are preferred since no alkali ions diffuse into a transparent conductive oxide.

Transparent resins are also suitably used as a material of substrate. Specific examples thereof include polyester resins, polycarbonate resins, polyarylate resins, polyether sulfone resins, acrylic resins, polyimide resins, polyamide resins, maleimide resins, polyether sulfone resins and vinyl chloride resins.

(3) Heat Resistance

The substrate body has preferably heat resistance to a degree that it withstands heating temperature without deformation during a heating step for crystallization.

Specifically when using a transparent resin as a material constituting a substrate body, the heat resistance temperature is preferably 260° C. or more, more preferably 280° C. or more. When using a glass material as a material constituting a substrate body, the heat resistance temperature is preferably 510° C. or more, more preferably 550° C. or more.

The heat resistance temperature of electrode substrate is defined to be a heating temperature (Tg1) at which its weight is reduced by 1% from the initial weight measured by a thermal balance.

(4) Refractive Index

The substrate body preferably has a refractive index of 2.2 or less.

When used in a reflection liquid-crystal display element and the like, interface reflection between the substrate body and electrode layer or liquid-crystal layer can be suppressed by such a refractive index, thereby preventing decrease in contrast.

However if the refractive index of substrate body is excessively small, the kind of usable materials may be extremely limited.

Thus the refractive index of substrate body is preferably 1.5 to 2.1, more preferably 1.6 to 2.0.

(5) Shape

The planer shape of substrate body is properly selected dependently on its applications. For example preferred shapes include long circle, circle, ellipse, polygon and irregular shapes.

The area of substrate body is preferably $1 \times 1$ cm$^2$ to $100 \times 100$ cm$^2$.

If the area is less than $1 \times 1$ cm$^2$, the information display properties may be degraded. If the area exceeds $100 \times 100$ cm$^2$, such a substrate body may be hardly manufactured with a lower yield.

The thickness of substrate body is preferably 15 $\mu$m to 5 mm.

If the thickness is thinner than 15 $\mu$m, the mechanical strength may be reduced. If the thickness exceeds 5 mm, such a substrate body may be hardly manufactured and loses light weight.

The thickness of substrate body is more preferably 50 $\mu$m to 3 mm, further more preferably 200 $\mu$m to 2 mm.

(6) Division

The substrate body is not required to be an independent peace. It may be preferably composed of plural dividable peaces, or one peace formed of plural peaces electrically or mechanically combined by connecting members such as connectors.

When using plural peaces, a substrate body can be desirably shaped with a desired area by properly selecting and combining peaces.

A substrate body may be made of plural peaces in advance, and an electrode substrate may be then formed on the substrate surface. Alternatively grooves may be made as divisional lines on the back surface of a substrate body in advance, an electrode substrate is formed on the substrate surface and the substrate may be then divided to plural peaces by using the grooves.

(7) Multi-Layered Composite

Figure 2:
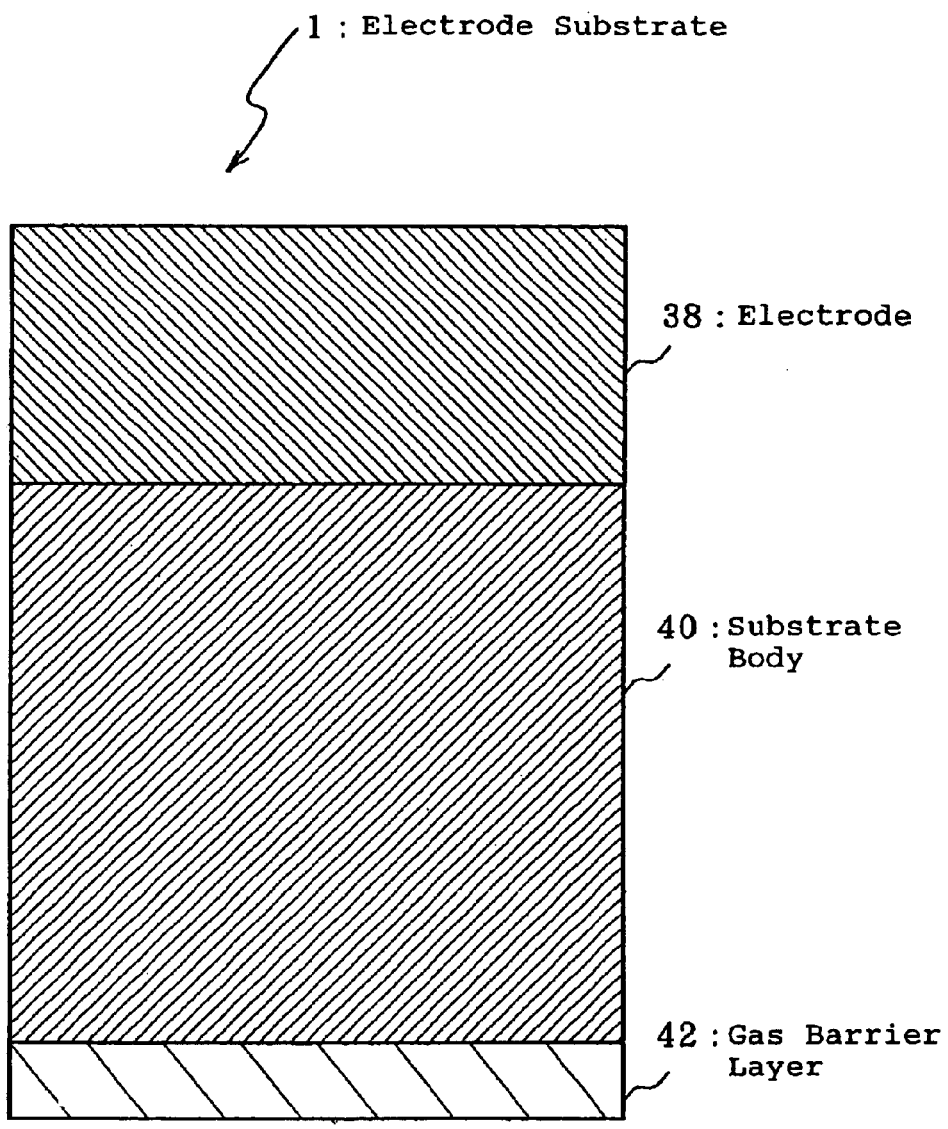
FIG. 2 is a diagrammatic sectional view for explaining the structure of electrode substrate that is formed to be a multi-layered composite.

A substrate body may be a multi-layered composite dependently on its applications. Specifically, as shown in FIG. 2, a gas barrier layer 42 is formed on the surface of substrate body opposite to the surface on which an electrode substrate is arranged. A laminated layer is not limited to the gas barrier layer and a hard coat layer, antireflection layer or the like can be formed correspondingly to its applications.

Preferred materials for such gas barrier layer include ethylene-vinyl alcohol copolymer, polyvinyl alcohol, polyacrylonitrile, polyvinylidene chloride and polyvinylidene fluride.

Materials for the hard coat layer include titanium- or silica-based hard coat agents, polymer materials such as polymethyl methacrylate and inorganic polymer materials such as polyphosphazene.

Materials for the antireflection layer include low-refractive index polymers such as fluorine resins and acrylic resins, inorganic fluorides such as $MgF_2$ and $CaF_2$, and inorganic oxides such as $SiO_2$, $ZnO$, $BiO_2$ and $Al_2O_3$.

A substrate body is preferably formed as a multi-layered composite by adhering a glass member to an ordinary film member with an adhesive and the like.

For this structured electrode substrate, an electrode can be effectively formed on a roll-like film member and a glass member is laminated on the film member, thereby enabling easy production of reinforced electrode substrate.

(8) Colored Layer and Light Shading Layer

Figure 3:
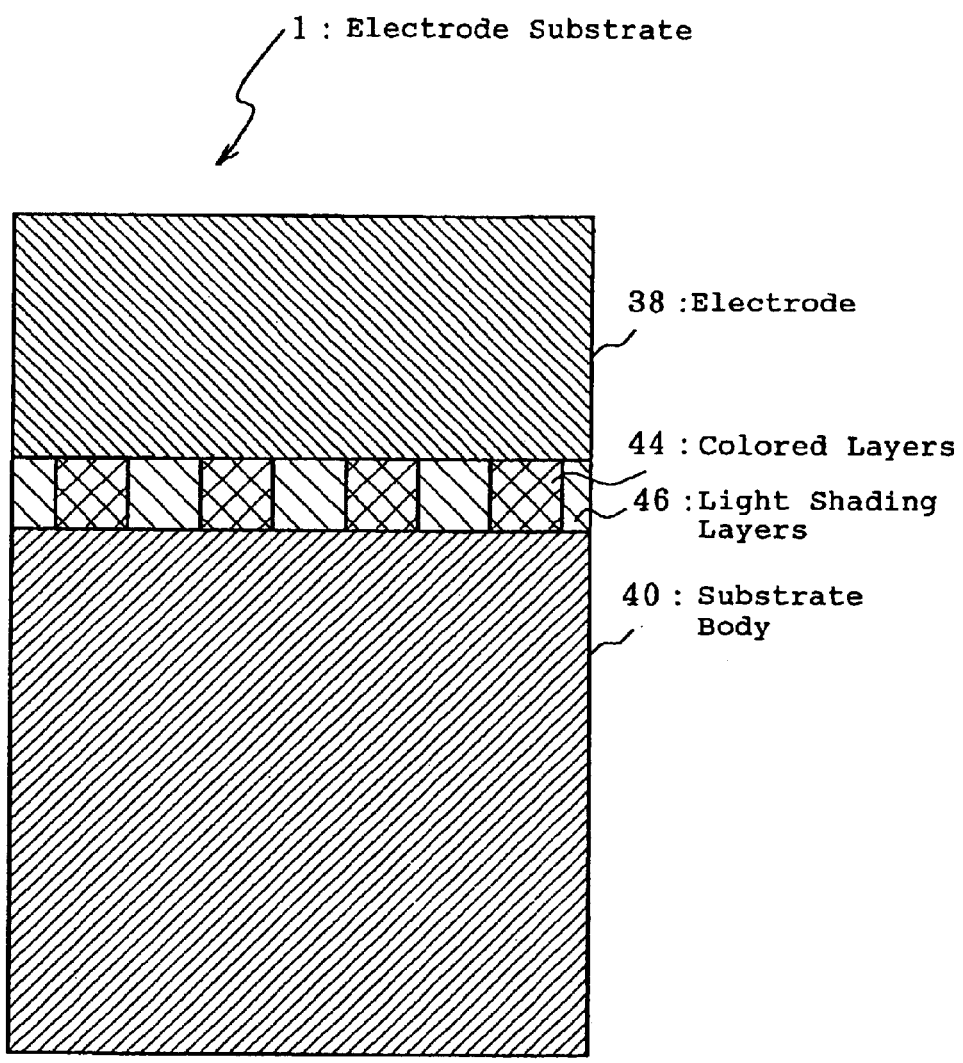
FIG. 3 is a diagrammatic sectional view for explaining the structure of electrode substrate in which colored layers and light shading layers are formed.

Dependently on applications of electrode substrate, as shown in FIG. 3, colored layers 44 and light shading layers 46 are preferably arranged as functional layers on a substrate body before the formation of electrode described later. Either of colored layers and light shading layers, not both the layers, may be preferably formed.

This structure can provide an electrode substrate with contract improving and color filter functions.

The colored layers are preferably made of a resin composition containing a coloring agent and binder resin.

Coloring agents include perylene pigments, lake pigments, azo pigments, quinacridon pigments, anthraquinone pigments, anthracene pigments, isoindoline pigments, isoindolinone pigments, phthalocyanine pigments, triphenylmethane basic dyes, indanthrone pigments, indophenol pigments, cyanine pigments and dioxadine pigments.

Suitably used binder resins include epoxy resins, urethane resins, urea resins, acrylic resins, polyvinyl alcohol resins, polyimide resins and mixtures thereof.

The light shading layers are to prevent interaction between the substrate body and coloered layer. A chromium film, a partially-oxidized chromium film and oxidized silicon film are suitably used as their material.

(9) Surface Roughness (P-V Value)

The P-V value (according to JIS B0601) of the surface of substrate body is preferably 1 μm or less, more preferably 0.5 μm or less, further more preferably 0.1 μm or less.

If the P-V value is 1 μm or less, unevenness of substrate surface does not adversely affect the lamination of an electrode thereon so that an electrode with an excellent surface smoothness can be obtained.

Thus by controlling the P-V value on the surface of substrate body in a certain range, the etching properties and resistance stability of the electrode can be enhanced.

2. Electrode (1) $In3d_{5/2}$ Orbit Spectral Peak

In the electrode, the ratio of the half band widths of $In3d_{5/2}$ orbit spectral peaks in the electrode surface and interior, $[In3d_{5/2}]_h/[In3d_{5/2}]_n$, is from 0.9 to 1.2.

It is found that if there are many surface defects in the electrode surface, the valence of In atoms change dependently on the properties of defects, resulting in changes in energy state of inner-shell electrons of In. Thus the composition of electrode surface and binding state of atoms can be examined by $In3d_{5/2}$ orbit spectral peaks measured by XPS.

Next the relationship between $In3d_{5/2}$ orbit spectral peaks and the state of electrode surface will be explained.

Figure 4:
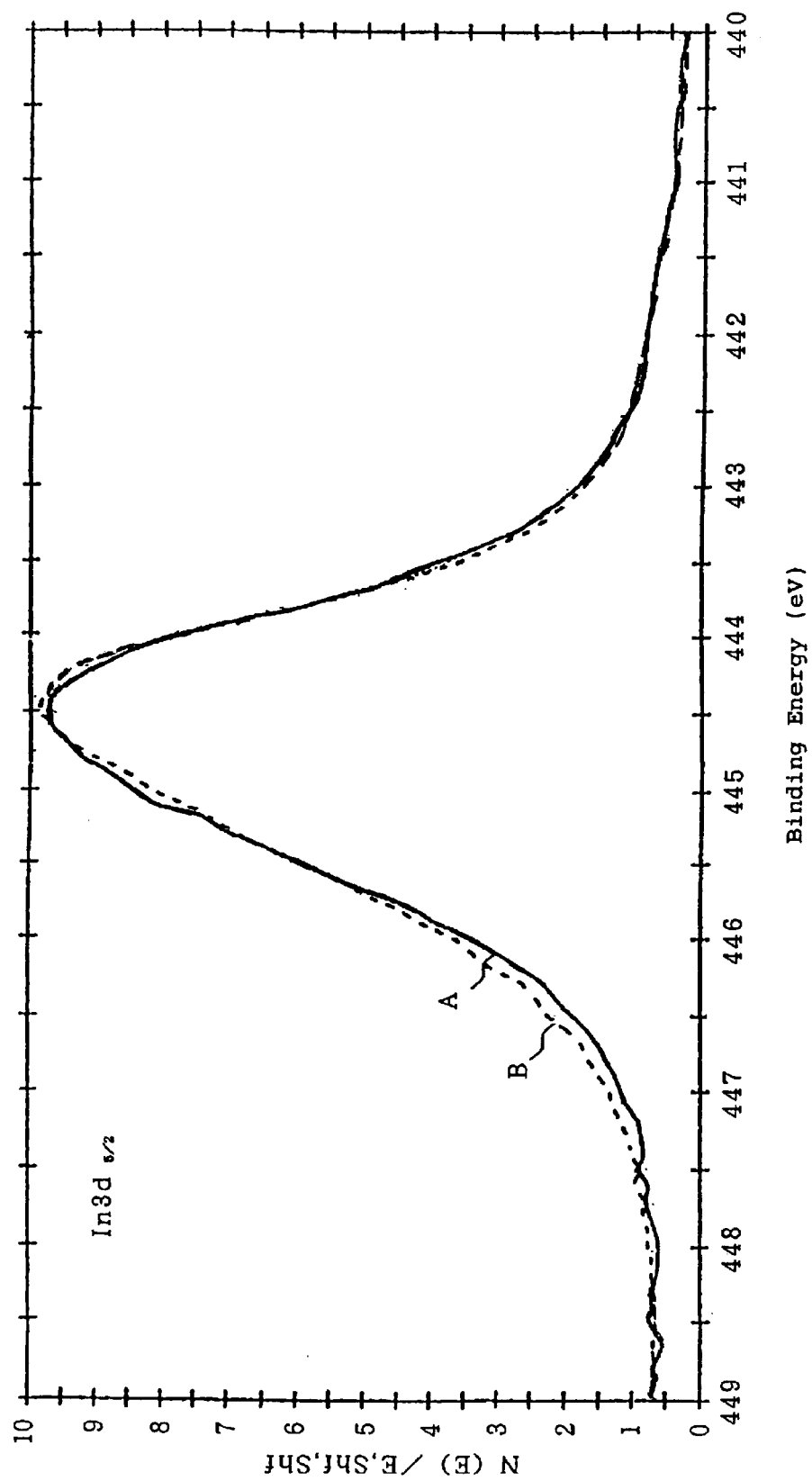
FIG. 4 is a view showing $In3d_{5/2}$ orbit spectral charts in an ITO surface and interior subjected to inverse sputtering.

As shown in FIG. 4, $In3d_{5/2}$ orbit spectral peaks in the surface and interior of an electrode made of indium tin oxide (ITO) are measured.

In FIG. 4, the axis of abscissa shows the binding energy (eV) of $In3d_{5/2}$ measured by X-ray photoelectron spectroscopy (XPS), while the axis of ordinate shows the strength of peak.

In FIG. 4, "A" represents an $In3d_{5/2}$ orbit spectral peak measured by XPS in an ITO (electrode) surface coated with a $CeO_2$ film (surface protection film) with a 20 Å thickness by $Ar^+$ of RF sputtering.

Thus, the $In3d_{5/2}$ orbit spectral peak A shows that surface defects do not increase since the ITO surface is covered with the $CeO_2$ film and not contacted directly with the atmosphere.

Even if the ITO surface has the $CeO_2$ film (surface protection film) with a 20 Å thickness thereon, an $In3d_{5/2}$ orbit spectral peak of the ITO surface can be measured without removing the $CeO_2$ film from the point of view of XPS principle.

"B" represents an $In3d_{5/2}$ orbit spectral peaks in the state where the ITO with the $CeO_2$ film (surface protection film) explained on the chart A is etched by $Ar^+$ for detecting XPS depth profiles to make the interior of ITO exposed, that is, at the depth of 50 Å.

These $In3d_{5/2}$ orbit spectral peaks show that the inverse sputtering of ITO surface improves the electrode. Specifically it makes the state of the electrode surface (A) similar to that of the electrode interior (B), thereby reducing surface defects.

The form of peak A in FIG. 4 does not significantly change even if the surface is exposed to the atmosphere at ordinary temperature and pressure for 5 hours. This means that the surface protection film can effectively prevent the occurrence of surface defect again after inverse sputtering for a certain period of time.

The first embodiment is characterized in that the half band width $[In3d_{5/2}]_h$ of $In3d_{5/2}$ orbit spectral peak in the ITO surface shown in FIG. 4 and the half band width $[In3d_{5/2}]_n$ of $In3d_{5/2}$ orbit spectral peak in the ITO interior shown in FIG. 4 are calculated to obtain the ratio of these half band widths, and the ratio is adjusted to be in the range of 0.9 to 1.2.

Figure 6:
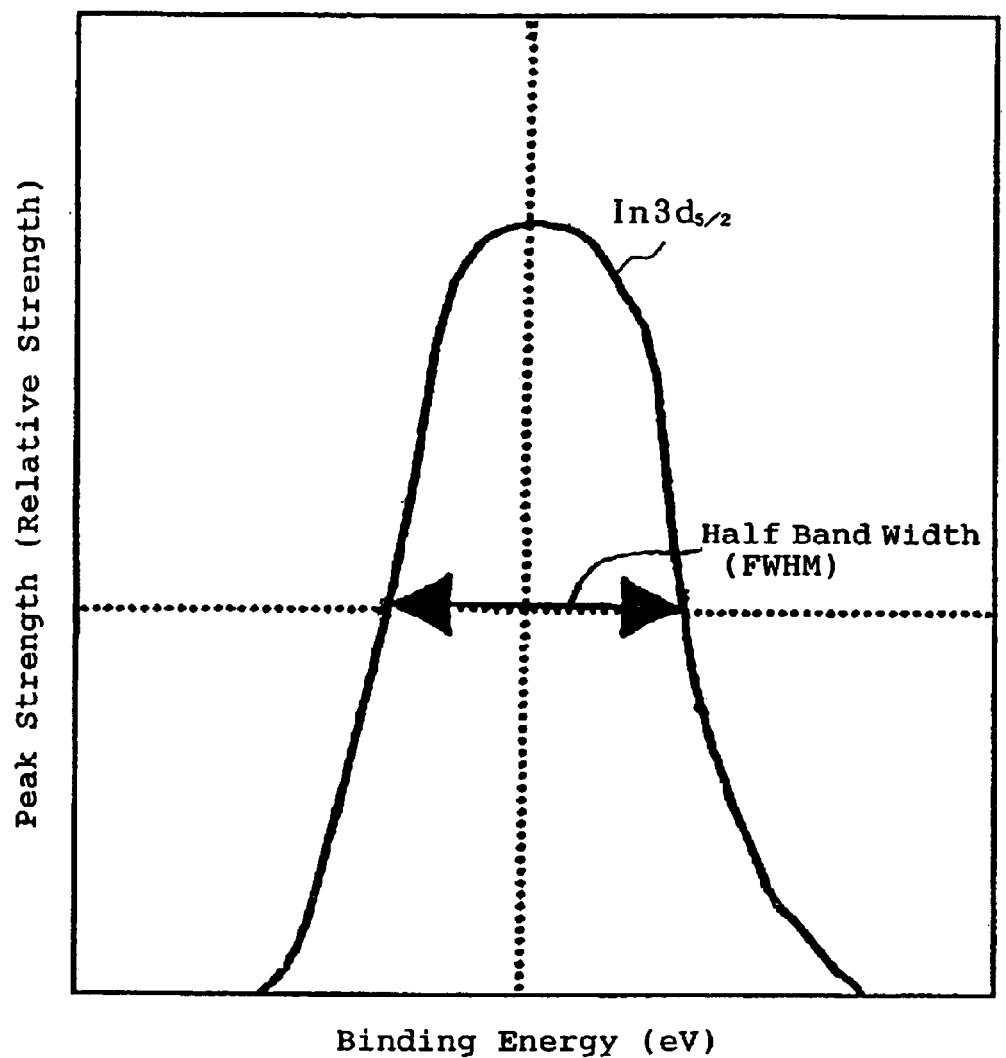
FIG. 6 is a diagrammatic view showing a half band width of an $In3d_{5/2}$.

The half band width (FWHM (full width at half maximum)) of $In3d_{5/2}$ is a binding energy width at the half of maximum $In3d_{5/2}$ peak strength as shown in FIG. 6. In FIG. 6, the axis of abscissa shows binding energy (eV) of $In3d_{5/2}$ measured by X-ray photoelectron spectroscopy (XPS), while the axis of ordinate shows the strength of peak.

If the ratio of half band widths is less than 0.9, the electrical resistance in the electrode surface becomes larger or the electrical resistance changes with the passage of time, which is caused by difference in composition between the electrode surface and interior.

If the ratio of half band widths is larger than 1.2, the electrical resistance in the electrode surface similarly becomes larger or the electrical resistance changes with the passage of time, which is caused by many surface defects.

Thus the ratio of half band widths is more preferably from 0.95 to 1.15, further more preferably from 0.98 to 1.1.

(2) $3d_{5/2}$ Orbit Spectral Peak of Sn Atom

Figure 7:
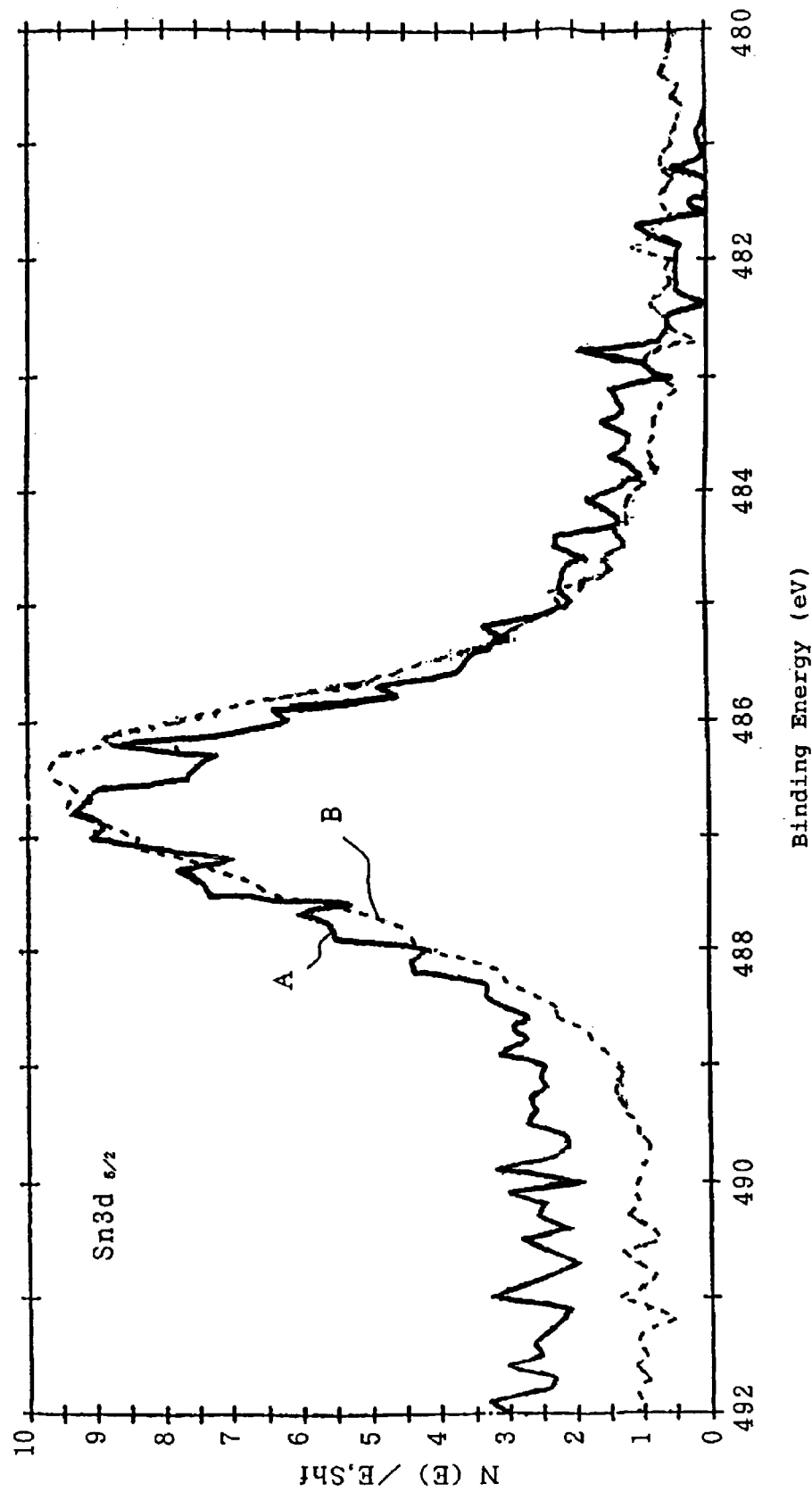
FIG. 7 is a view showing $Sn3d_{5/2}$ orbit spectral charts in an ITO surface and interior subjected to inverse sputtering.

In FIG. 7, "A" represents a $3d_{5/2}$ orbit spectral peak of Sn atoms ($Sn3d_{5/2}$ orbit spectral peak) measured by XPS in an ITO (electrode) surface coated with a $CeO_2$ film (surface protection film) with a 20 Å thickness by $Ar^+$ of RF sputtering.

"B" represents a $Sn3d_{5/2}$ orbit spectral peak in the state where the ITO with the $CeO_2$ film (surface protection film) explained on the chart A is etched by $Ar^+$ for detecting XPS depth profiles to make the interior of ITO exposed, that is, at the depth of 50 Å.

It can be understood from FIG. 7 that a defective surface layer, i.e., a part in which the composition ratio of Sn atoms changes, can be effectively removed from an ITO surface by subjecting the ITO surface to inverse sputtering; the state A of electrode surface is similar to the state B of electrode interior; and there are few of surface defects.

(3) 1s Orbit Spectral Peak of Oxygen (O) Atom

In the case where a surface protection layer is not made of an oxide or composite oxide, the existence of surface defects in an electrode can be predicted from an 1s orbit peak measured by XPS.

Figure 8:
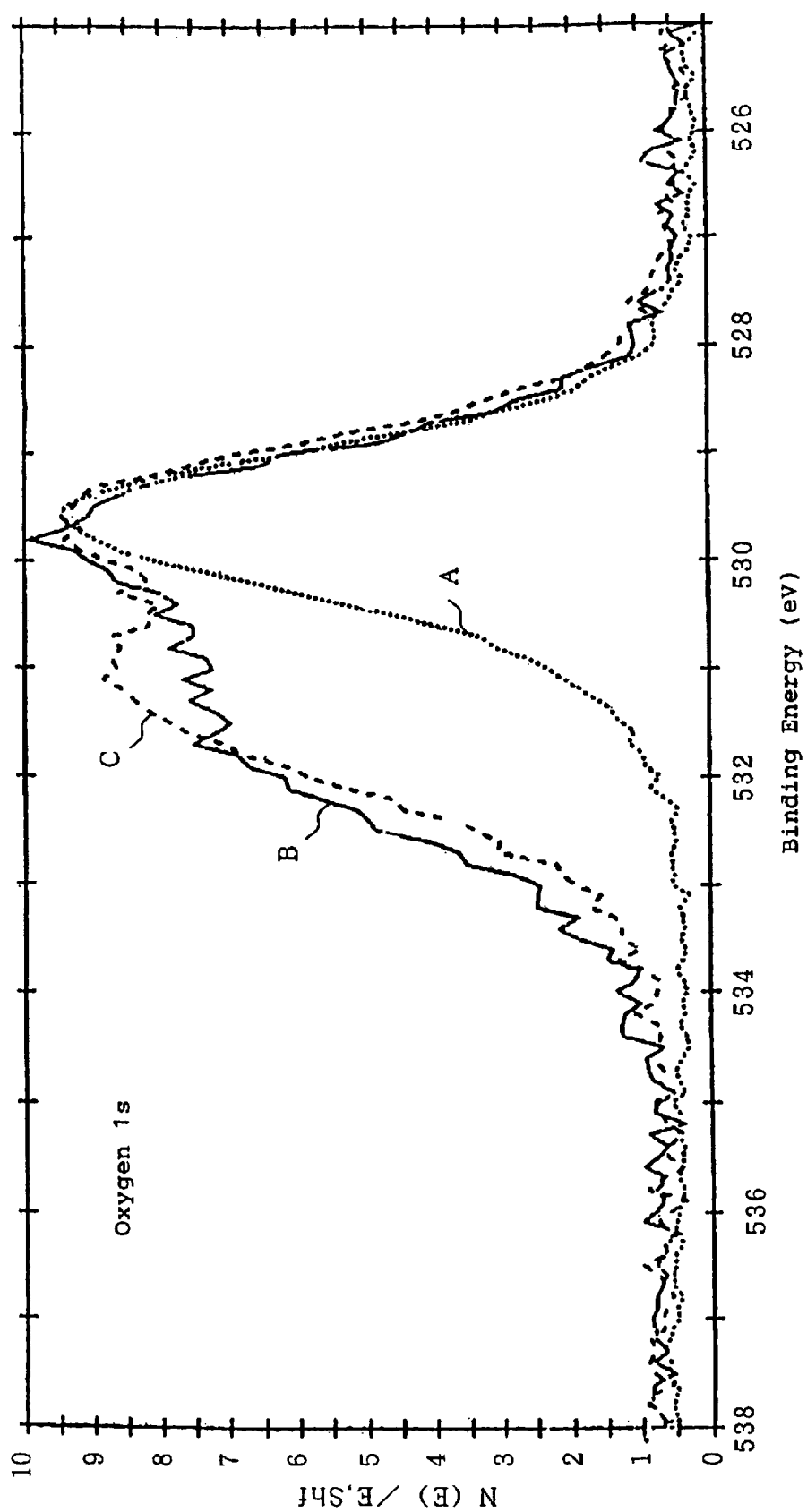
FIG. 8 is a diagrammatic view for explaining changes per time of oxygen 1s orbit spectrum in an ITO surface subjected to inverse sputtering.

In FIG. 8, the axis of abscissa shows the binding energy (eV) of oxygen 1s orbit peak measured by X-ray photoelectron spectroscopy (XPS), while the axis of ordinate shows the strength of peak.

As shown in FIG. 8, the area ratio $S_B/S_A$ preferably satisfy the following formula:

$$S_B/S_A < 0.3$$

wherein $S_A$ is the area of a peak A that is an oxygen 1 s orbit peak at the binding energy of 530±0.5 eV, and $S_B$ is the area of a peak B that is an oxygen 1s orbit peak at the binding energy of 532±1.0 eV.

The area ratio $S_B/S_A$ of 0.3 or larger may mean the ratio of attached oxygen derived from impurities to oxygen derived from In oxides increases over an allowable range.

Thus the area ratio $S_B/S_A$ is preferably 0.2 or less, more preferably 0.1 or less.

The area ratio can be controlled by adjusting the flow amount of sputtering gas or changing a distance from a substrate, sputtering time, kind of sputtering gas, sputtering gas pressure, evacuated pressure and the like, as described later.

In FIG. 8, "A" represents a peak chart derived from the 1s orbit of oxygen by XPS in an ITO surface that has been subjected to inverse sputtering for 1 minute by $Ar^+$ of RF sputtering. "B" represents an oxygen 1s orbit peak chart by XPS in the ITO surface before the inverse sputtering, and "C" represents an oxygen 1s orbit peak chart by XPS in the ITO surface that has been subjected to inverse sputtering and then exposed to the atmosphere for 5 hours.

The measurement results show that the half band width of oxygen 1s orbit peak in the ITO surface becomes narrower by subjecting the electrode to inverse sputtering (A); but this effect is lowered and the half band width comes back to the state (B) in which inverse sputtering is not carried out by the exposure to the atmosphere for 5 hours (C).

Figure 5:
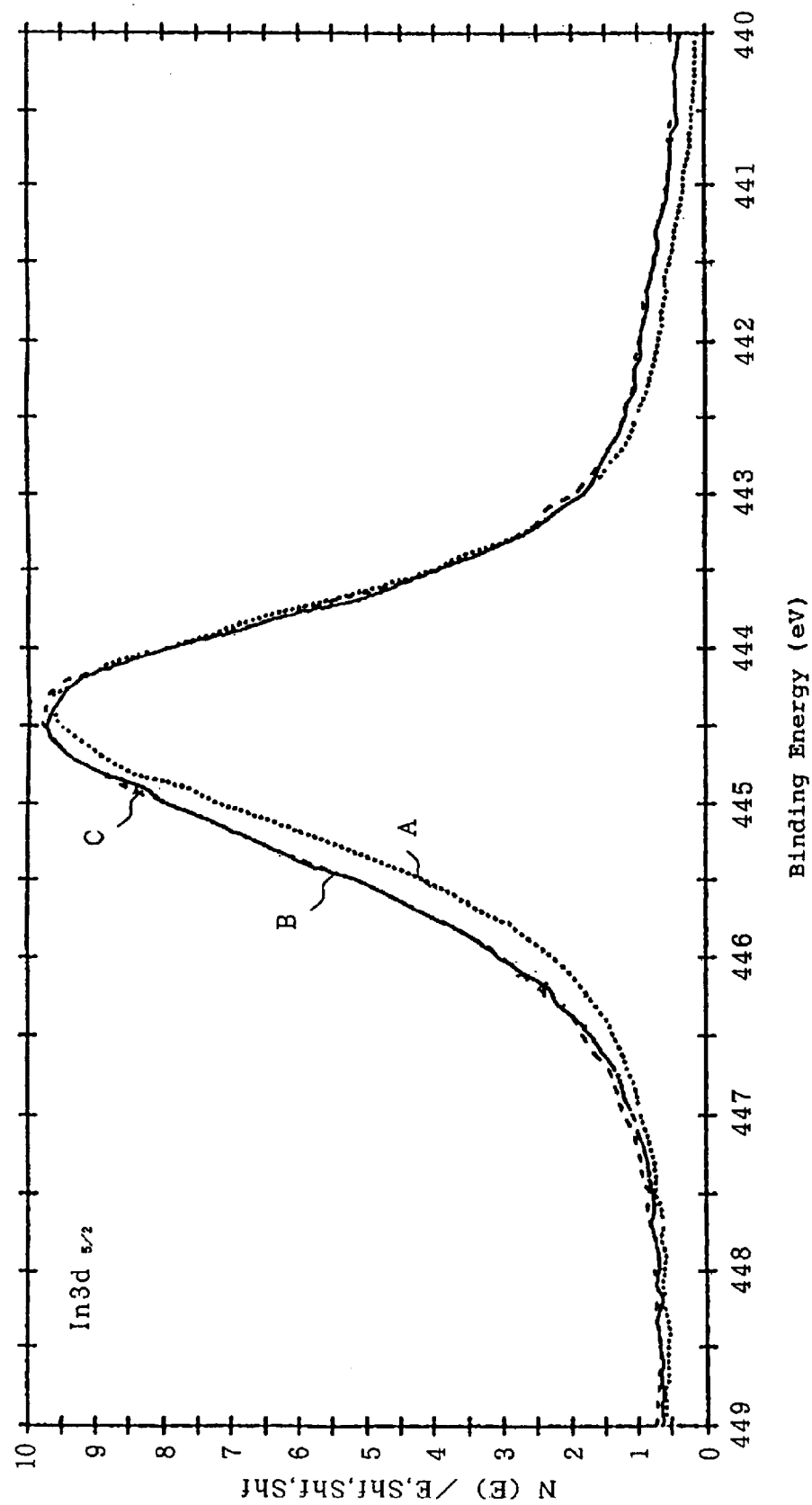
FIG. 5 is a diagrammatic view for explaining changes per time of $In3d_{5/2}$ orbit spectrum subjected to inverse sputtering.

However if the electrode is exposed to the atmosphere for a longer period of time, binding energy (eV) of $In3d_{5/2}$ may be lowered as shown in FIG. 5.

In FIG. 5, the axis of abscissa shows the binding energy (eV) of $In3d_{5/2}$ measured by X-ray photoelectron spectroscopy (XPS), while the axis of ordinate shows the strength of peak.

"A" represents an $In3d_{5/2}$ orbit spectral peak in an ITO (electrode) surface that has been subjected to inverse sputtering for 1 minute by $Ar^+$ of RF sputtering.

"B" represents an $In3d_{5/2}$ orbit spectral peak in the ITO surface before the inverse sputtering, and "C" represents an $In3d_{5/2}$ orbit spectral peak by XPS in the ITO surface that has been subjected to inverse sputtering and then exposed to the atmosphere for 5 hours.

The measurement results show that the half band width of $In3d_{5/2}$ described later becomes narrower by subjecting the electrode to inverse sputtering (A); but this effect is lowered and the half band width comes back to the state (B) in which inverse sputtering is not carried out by the exposure to the atmosphere for 5 hours (C).

Thus an electrode that has been subjected to inverse sputtering is preferably subjected to a next processing within 3 hours after the inverse sputtering without contacting to the atmosphere. More preferably the electrode is subjected to a next processing within 1 hour, further more preferably 30 minutes, after the inverse sputtering.

In the case where an electrode substrate is stored for a long period of time, it is preferably stored in a vacuumed container.

Figure 9:
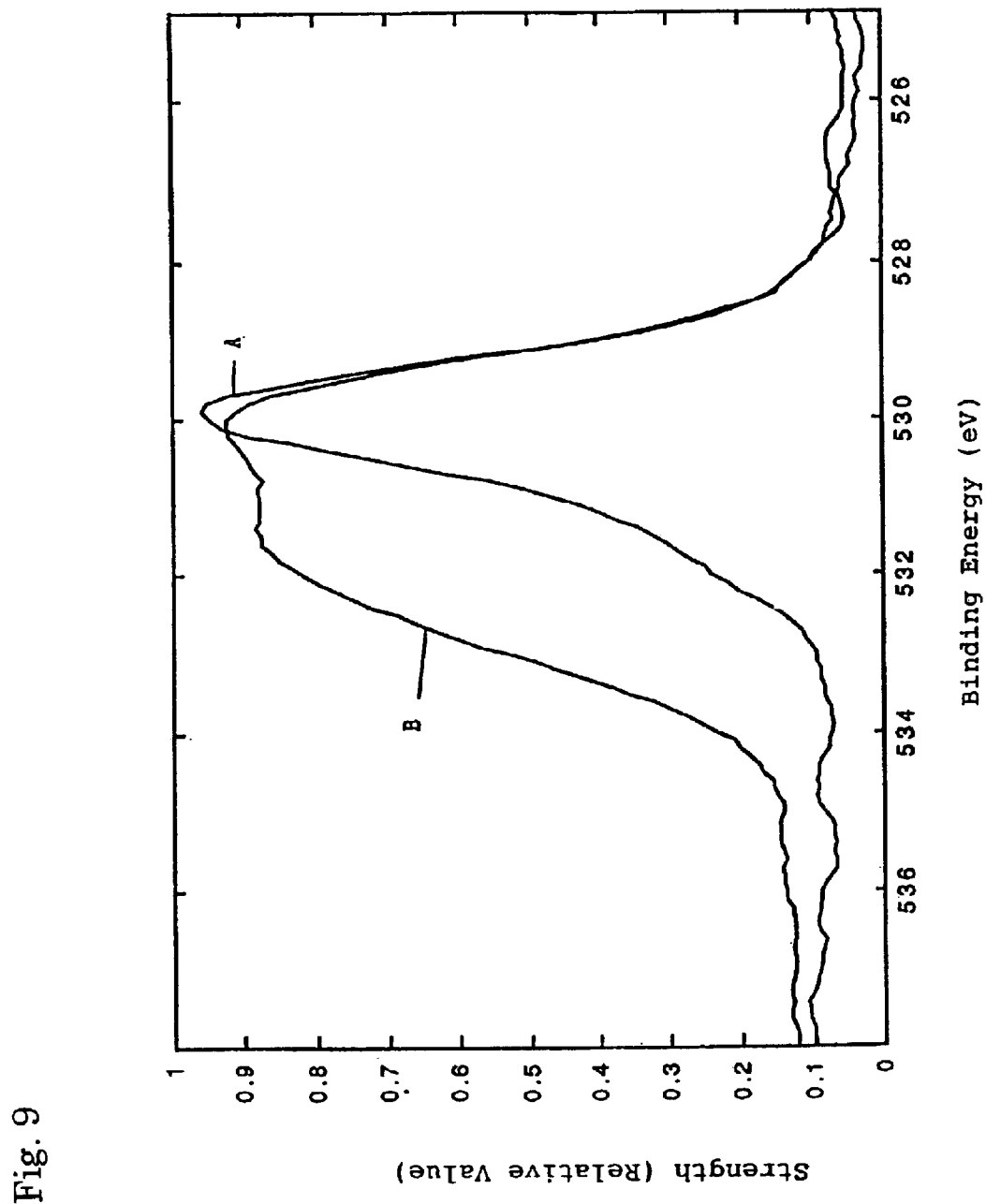
FIG. 9 is a view showing oxygen 1s orbit spectral peaks in an ITO surface attached with a carbon film.

In FIG. 9, "A" represents a chart of an oxygen 1 s orbit peak in an ITO surface with a carbon film of a 20 Å thickness and "B" represents a chart of an oxygen 1s orbit peak in the ITO surface with the carbon film that has been exposed to the atmosphere for 10 hours.

Figure 10:
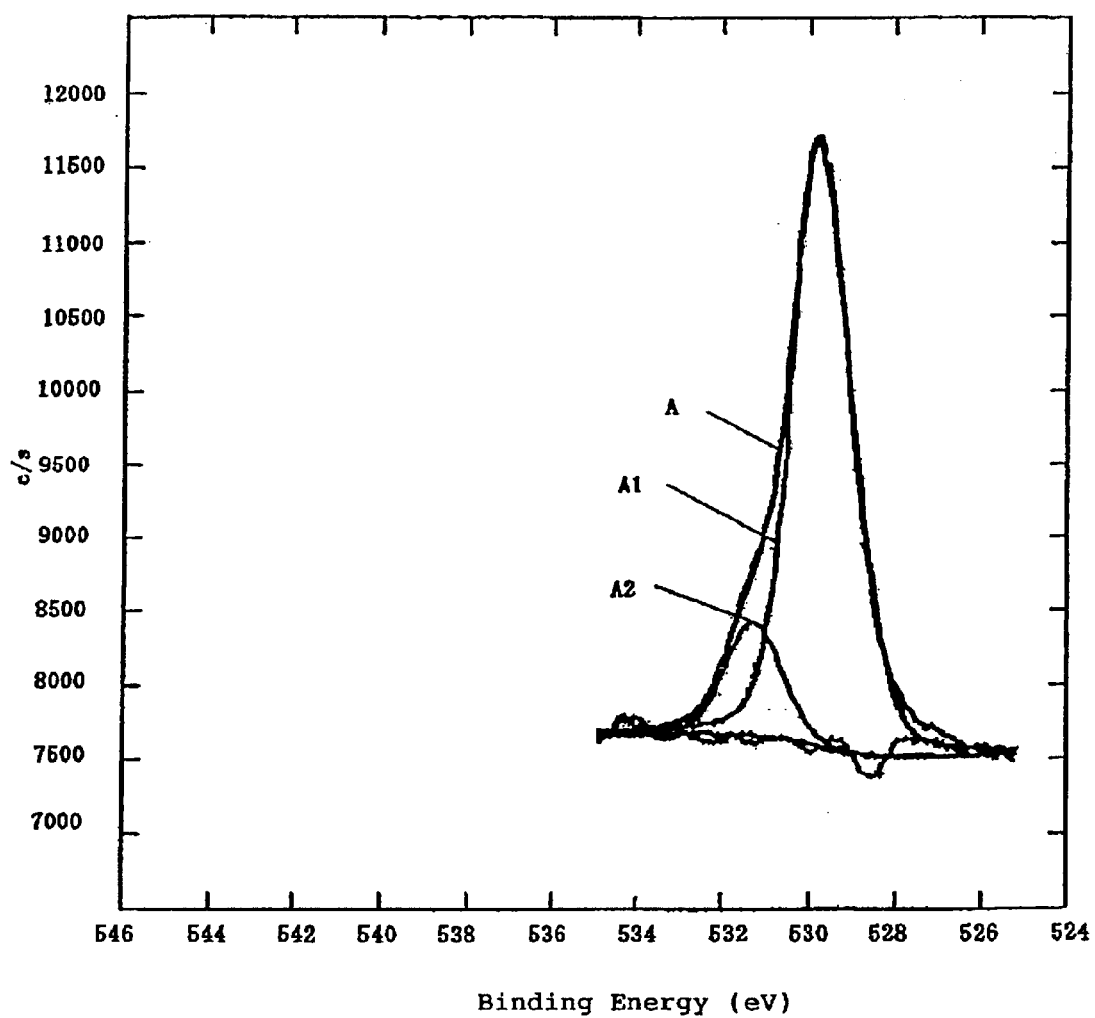
FIG. 10 is a view showing charts obtained by waveform separation of the chart A shown in FIG. 9.

FIG. 10 shows charts A1 and A2 obtained by the waveform separation of the chart A shown in FIG. 9.

Figure 11:
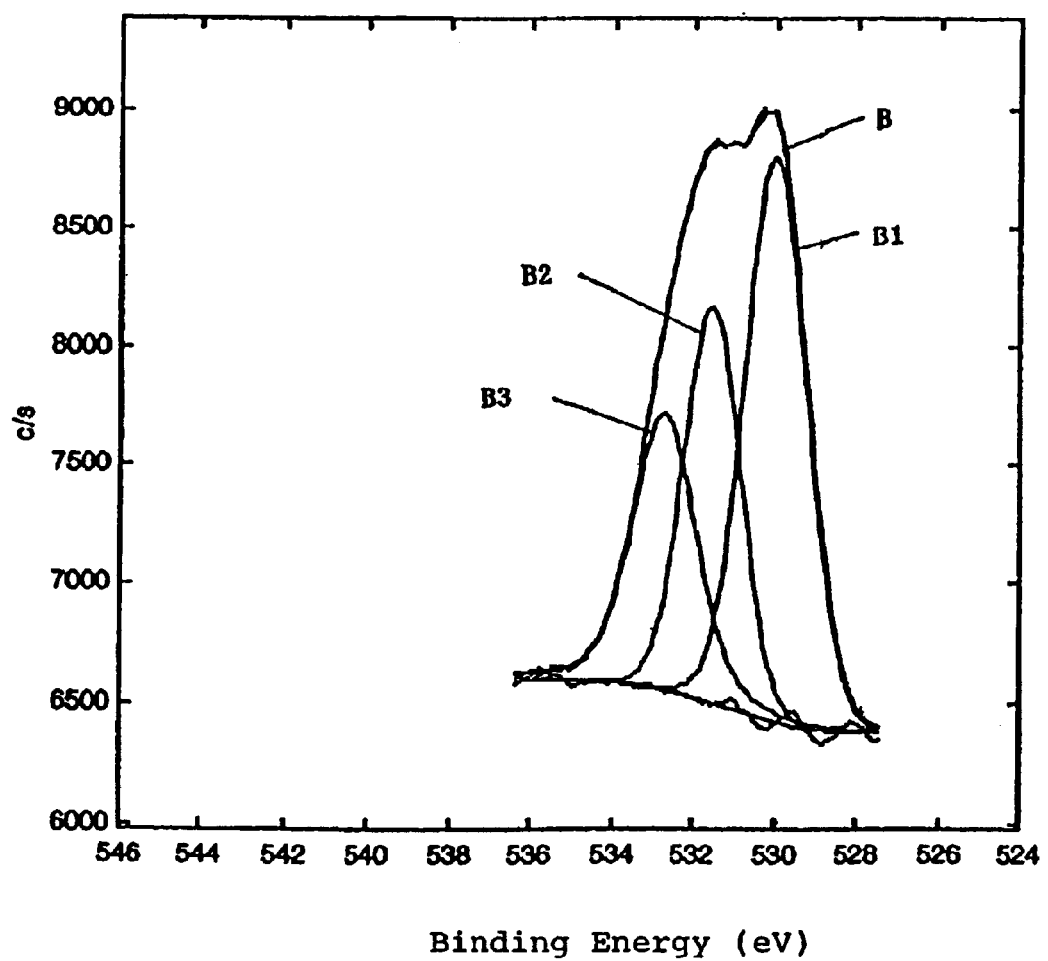
FIG. 11 is a view showing charts obtained by waveform separation of the chart B shown in FIG. 9.

FIG. 11 shows charts B1, B2 and B3 obtained by the waveform separation of the chart B shown in FIG. 9.

These charts of waveform separation show that if ITO with carbon is exposed in an air atmosphere at atmospheric pressure, the composition of ITO surface changes to produce a defective surface layer.

(4) Constituent Material

Preferred materials for an electrode include indium-containing compounds such as ITO and IZO.

ITO is a crystalline oxide prepared by a sputtering method using a sintered target containing indium oxide and tin oxide. ITO advantageously has a high transparency and low resistance, which is important for an electrode, and it has been widely used.

ITO can be an amorphous oxide by controlling film-forming conditions, minute amounts of element dopants and the like although ITO is generally crystalline. A transparent conductive film that is amorphous rather than crystalline is desired, for example, as an anode for organic EL elements in view of reducing short circuit and the like of elements by suppressing unevenness of the surface.

IZO is usually an amorphous oxide prepared by a sputtering method using a sintered target containing indium oxide and zinc oxide, or indium oxide, tin oxide and zinc oxide. IZO has excellent etching properties and moisture-heat-proof properties.

It is known that if a film is formed from IZO at ordinary temperature, the IZO film is amorphous with a low resistance. Further it is known that IZO is not crystallized and remains as a stable amorphous film even if it is annealed at about 200° C. of substrate temperature.

Generally materials with a large work function are preferably used as a material constituting an electrode in an electrode substrate suitable for EL display elements and the like to facilitate injection of holes. Specifically the materials preferably have a work function of 4 eV or more, more preferably 5 eV or more. Thus, indium-containing compounds such as ITO and IZO are preferred.

Among the above indium-containing compounds, amorphous oxides are more preferred as a material constituting an electrode.

Such amorphous oxides can be etched by weak acids such as oxalic acid. That is, it is not required to use strong acids such as hydrochloric acid and aqua regia as an etching liquid so that the contents of impurity ions such as chlorine can be reduced. In addition, such amorphous oxides allow prompt etching processing at low cost since the formation of a resist (protection film) is not necessary for a wiring electrode at the time of etching.

Preferably the amorphous oxides do not substantially contain crystalline compounds but may contain 10 wt % or less of crystalline compounds.

When an electrode is composed of an indium-containing compound, a target is preferably formed from the material powder since it can be easily formed by a sputtering method.

Indium oxide precursors and zinc oxide precursors are preferably used as material powder. Specifically material powders include sulfides, sulfates, nitrates, halides (chlorides, bromides and so on), carbonates, organic acid salts (acetates, oxalates, propionates, naphthanoates and so on), alkoxide compounds (methoxide compounds, ethoxide compounds and so on), and organic metal complexes (acetyl acetonate compounds and so on) of indium, zinc and tin.

Among these, nitrates, organic acid salts, alkoxides and organic metal complexes are preferred since they are completely thermally decomposed even at low temperature so that no impurities remain.

(5) Light Transmittance

An electrode 38 in an electrode substrate 1 shown in FIG. 1 is preferably formed of a transparent material, since light transmitted from transmission liquid-crystal display elements and light emitted from organic EL elements can be effectively taken to the outside.

Specifically transparent materials used have preferably a light transmittance (thickness: 1 mm) of 50% or more for visible light (wavelength 500 nm), more preferably 60% or more, further more preferably 80% or more.

(6) Refractive Index

An electrode preferably has a refractive index of 2.1 or less.

This is because this refractive index enables to suppress interface reflection generated in the interface between an electrode and a substrate body or liquid-crystal layer, thereby preventing decrease in contrast, when used in a reflection liquid-crystal display elements and the like.

Thus an electrode more preferably has a refractive index of 2.0 or less, furthermore preferably 1.9 or less.

(7) Sheet Resistance

An electrode preferably has a sheet resistance of 100 Ω/□ or less.

If a sheet resistance exceeds 100 Ω/□, a driving voltage may excessively increase so that problems such as heat generation arise.

However if a sheet resistance is excessively low, an electrode may be required to be excessively thick or the kinds of materials constituting an electrode may be excessively limited.

Thus a sheet resistance is more preferably 0.001 to 20 Ω/□, further more preferably 0.01 to 10 Ω/□.

The sheet resistance of an electrode can be easily adjusted by partial crystallization by heat treatment.

In this case, the heat treatment temperature is preferably 230° C. or higher, more preferably 250° C. or higher, further more preferably 280° C. or higher for sufficient crystallization.

(8) Film Thickness

The thickness of an electrode (transparent conductive oxide) is preferably 3 to 3,000 nm although it can be properly selected dependently on applications, the material of a substrate with the transparent conductive oxide arranged thereon and the like.

If the thickness is thinner than 3 nm, the conductivity of electrode tends to be insufficient. If it exceeds 3,000 nm, the light transmittance of electrode may be lowered and crakes and the like may tend to generate in the electrode during and after the formation of electrode.

Thus the thickness of an electrode is preferably form 5 to 1,000 nm, more preferably 50 to 800 nm.

(9) Surface Protection Layer

Figure 12:
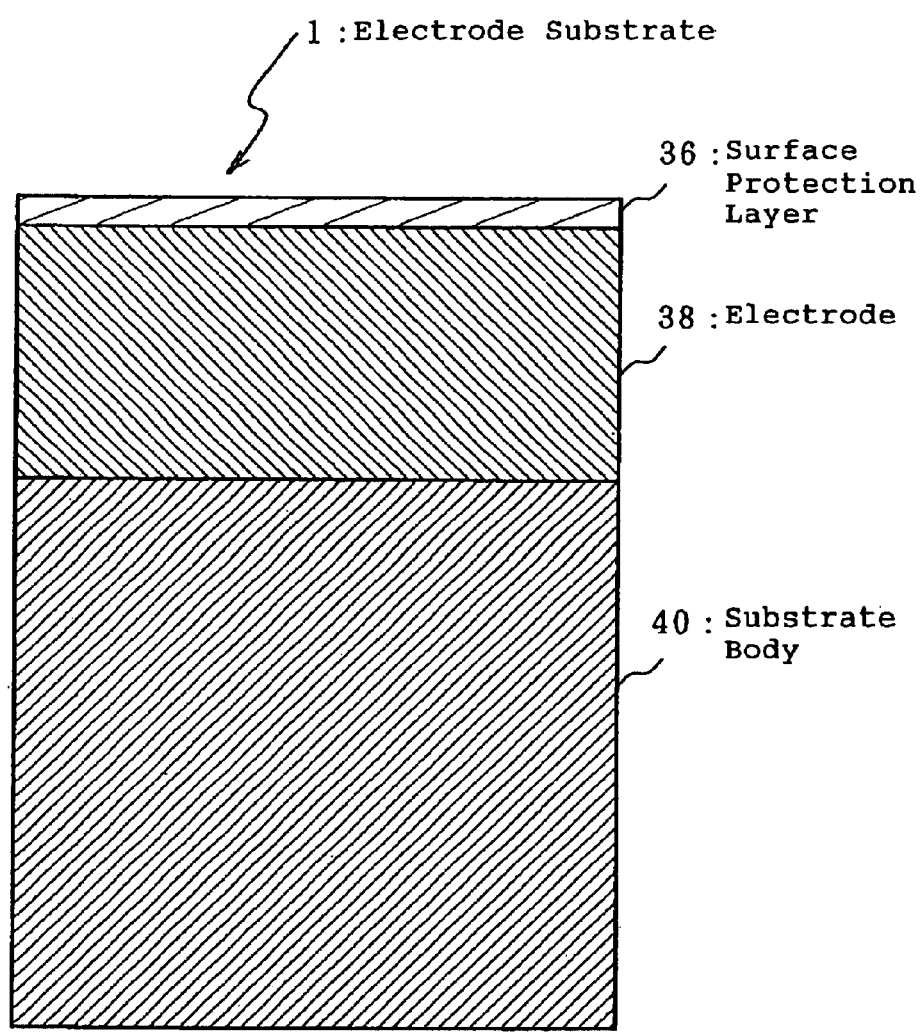
FIG. 12 is a diagrammatic sectional view for explaining the structure of electrode substrate with a surface protection layer.

As shown in FIG. 12, in an electrode substrate, a surface protection layer 36 made of inorganic compounds is preferably arranged on the surface of an electrode 38.

Such surface protection layer can protect the surface of electrode from the atmosphere and can maintain the ratio of half band widths of $In3d_{5/2}$ orbit spectral peaks in the surface and interior of electrode ($[In3d_{5/2}]_h/[In3d_{5/2}]_n$) in a certain range for a long period of time.

In addition, for the similar reasons, the surface protection layer can maintain the ratio of areas of certain binding energy peaks in oxygen 1s orbit spectral peaks ($S_B/S_A$) in a certain range for a long period of time.

Such Materials for the surface protection film include inorganic compounds such as oxides, nitrides, oxynitrides, sulfides, carbides and fluorides which contain one or two or more atoms selected from Li, Na, K, Rb, Cs, Cu, Mg, Ba, Ca, Sr, Zn, Cd, Al, Ga, In, Sc, Y, Si, Ge, Ti, Zr, Hf, Sb, Nb, Ta, Se, Cr, W, Fe, Co, Yb, Eu, Ce, La, Rb, Lu, Ho, Er, Sm and Tm.

Carbon is also preferable for the surface protection film, although it is organic compounds.

Specifically, the inorganic compounds for the surface protection film include metallic oxides and metallic nitrides such as LiOx, LiNx, NaOx, KOx, RbOx, CsOx, BeOx, MgOx, MgNx, CaOx, CaNx, SrOx, BaOx, ScOx, YOx, YNx, LaOx, LaNx, CeOx, PrOx, NdOx, SmOx, EuOx, GdOx, TbOx, DyOx, HoOx, ErOx, TmOx, YbOx, LuOx, TiOx, TiNx, ZrOx, ZrNx, HfOx, HfNx, ThOx, VOx, VNx, NbOx, NbNx, TaOx, TaNx, CrOx, CrNx, MoOx, MoNx, WOx, WNx, MnOx, ReOx, FeOx, FeNx, RuOx, OsOx, CoOx, RhOx, IrOx, NiOx, PdOx, PtOx, CuOx, CuNx, AgOx, AuOx, ZnOx, CdOx, HgOx, BOx, BNx, AlOx, AlNx, GaOx, GaNx, InOx, SiNx, GeOx, SnOx, PbOx, POx, PNx, AsOx, SbOx, SeOx and TeOx wherein x is from ½ to 2.

The materials also include metallic composite oxides such as $LiAlO_2$, $Li_2SiO_3$, $Li_2TiO_3$, $Na_2Al_2O_3$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $gFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_2O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $Na_2SiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$ and $Na_2TeO_4$, sulfides such as FeS, $Al_2S_3$, MgS and ZnS, fluoride such as LiF, $MgF_2$ and $SmF_3$, chlorides such as HgCl, $FeCl_2$ and $CrCl_3$, bromides such as AgBr, CuBr and $MnBr_2$, iodides such as $PbI_2$, CuI and $FeI_2$, and metallic oxides such as SiAlON.

Among these inorganic compounds, oxides containing a Ce atom are preferred since more dense surface protection film can be obtained.

CeOx is more preferred since driving voltage does not increase excessively. $CeO_2$ is most preferred since its handling is easier from the point of view of its properties.

However, in the case where oxides of Ce are used as a material constituting a surface protection film, the oxides include, but are not limited to, $CeO_2$, CeOx wherein $1.5<x\leq2$. It has been found that CeOx wherein x is not 2 has properties similar to those of $CeO_2$.

In case that the surface protection film is formed, its thickness is preferably from 1 Å to 100 Å.

If the thickness of surface protection film is less than 1 Å, the film may not be formed uniformly. If the thickness of surface protection film exceeds 100 Å, its transparency may be reduced, or the driving voltage may increase excessively.

For these reasons, the thickness is preferably from 5 Å to 75 Å, more preferably from 10 Å to 45 Å.

[Second Embodiment]

The second embodiment is directed to a method for producing an electrode substrate, which is characterized by comprising the steps of forming an electrode comprising an indium containing compound on a substrate body, and subjecting the surface of electrode thus formed to inverse sputtering.

1. Electrode Material Preparation Step (Containing Preparation of Target)

A target is preferably prepared from an electrode material in advance since a sputtering method can be used for the formation of electrode.

For the kind and average grain size of material powder, zinc oxide powder with an average grain size of 2 μm or less is preferably used.

If the average grain size exceeds 2 μm, zinc oxide is liable to diffuse and move for indium oxide and it therefore becomes difficult to control the crystal grain size of hexagonal layered compounds formed. Thus if such a target is used, nodules tend to generate during sputtering.

Conversely, if the average grain size is 2 μm or less, indium oxide is liable to diffuse and move for zinc oxide and the crystal grain size of hexagonal layered compounds can be controlled to be 5 μm or less to prevent the generation of nodules.

However if the average grain size of zinc oxide powder is excessively small, its handling may become difficult or the severe pulverizing treatment may be required, which leads to high cost.

Thus the average grain size of zinc oxide powder is preferably from 0.1 to 1.8 μm, more preferably from 0.3 to 1.5 μm, further more preferably from 0.5 to 1.2 μm.

Indium oxide powder preferably has substantially the same average grain size as zinc oxide powder.

Thus the average grain size of indium oxide powder used in the preparation of target is preferably 0.2 μm or less, more preferably from 0.1 to 1.8 μm, further more preferably from 0.3 to 1.5 μm, most preferably from 0.5 to 1.2 μm.

Moreover in the case of adding tin oxide powder to produce spinel-structured compounds and the like in a target, the average grain size of tin oxide powder is preferably from 0.01 to 1 μm, more preferably from 0.1 to 0.7 μm, further more preferably from 0.3 to 0.5 μm.

This is because the limitation of the average grain size of tin oxide powder to such a range facilitates to control the crystal grain sizes (5 μm or less) of hexagonal layered compounds and spinel compounds in a target.

(2) Electrode Formation Step

Preferred methods for forming an electrode include, but are not limited to, dry film forming methods such as deposition, sputtering, ion plating, electron beam deposition, chemical vapor deposition (CVD), metal-organic chemical vapor deposition (MOCVD) and plasma chemical vapor deposition (plasma CVD) to avoid influences of water absorption.

Among these methods, a sputtering method is preferred in view of properties of a transparent conductive oxide to be formed and productivity thereof.

After the film formation of electrode, it is preferably subjected to an etching treatment to be patterned. An aqueous solution having 3 to 10 wt % of oxalic acid is preferably used as an etching solution so as not to corrode wiring electrodes of display devices and the like.

(3) Inverse Sputtering Step

This step is the step where the surface of an electrode is subjected to inverse sputtering. In this step, an inverse sputtering processing using a sputtering method is preferred since it can effectively remove surface defects.

That is, power applied to a cathode (target) is lowered so that only plasma reaches to the surface of anode but sputtering particles (material of surface protection film) do not reach to the surface thereof under controlled conditions.

The inverse sputtering conditions in this step will be explained below.

(a) RF Sputtering Device

Ordinary RF sputtering devices are preferably used for inverse sputtering since they allow effective removal of surface defects in the surface of electrode. Among RF sputtering devices, more preferred is a helical sputtering method using an inductively coupled RF plasma sputtering magnetron sputtering device (ICMS) 10 as shown in FIG. 13.

Figure 13:
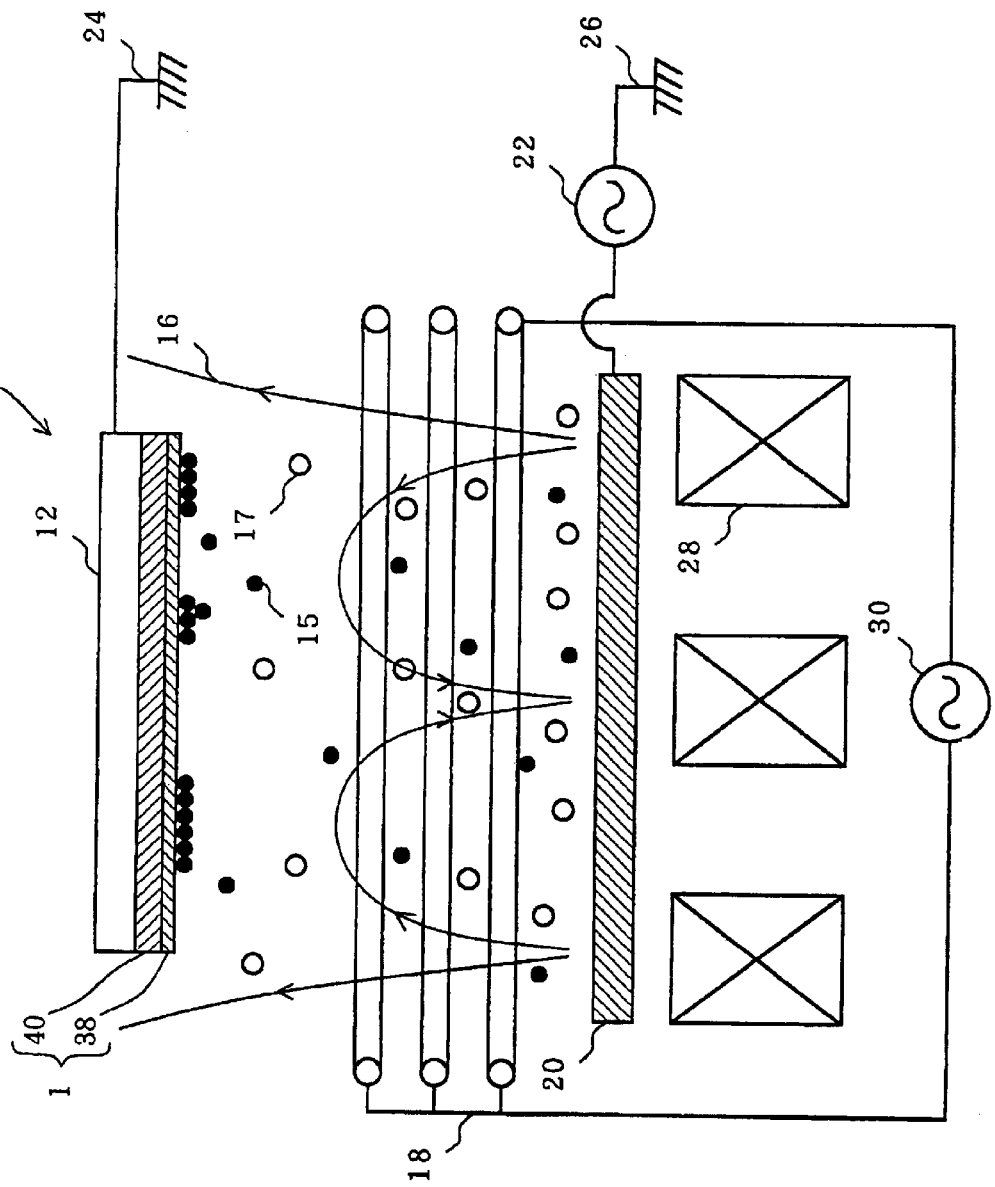
FIG. 13 is a diagrammatic view of an inductively coupled RF plasma supporting magnetron sputtering device.

As shown in FIG. 13, in the ICMS 10, there are provided around a target 20 a power 30 for supplying high-frequency waves to a RF band, and a helical coil 18 for inductive coupling. A magnetron generating device 28 is placed behind the target 20. The target 20 is driven by a high-frequency wave circuit 22 connected to an earth 26 electrically.

Further, in the ICMS 10, a substrate holder 12 connected to an earth 24 electrically is placed oppositely to the target 20 and an electrode substrate 1 is mounted to the holder 12 so that the surface of an electrode 38 formed on a substrate 40 can be subjected to inverse sputtering by a sputtering gas 17.

(b) Distance Between Target and Substrate

The ICMS is featured by that the relatively longer distance between target and substrate compared with ordinary RF sputtering devices.

Therefore surface defects can be effectively reduced by adjusting the distance between a target and substrate in a wider range. Sputtering damage to the electrode substrate (ITO substrate) can also be suppressed.

Specifically the distance between target and substrate is preferably from 15 cm to 50 cm.

If the distance is less than 15 cm, it may be difficult to control an inverse sputtering processing and suppress sputtering damage. If it exceeds 50 cm, it may be difficult to effectively reduce surface defects.

For these reasons, the distance is preferably from 20 cm to 40 cm, more preferably from 25 cm to 35 cm.

(c) Power and Frequency

When carrying out the helical sputtering method using an ICMS, preferably, power of 50 to 200 W and high-frequency waves of 13.56 to 100 MHz are applied to a helical coil, while power of 200 to 500 W and high-frequency waves of 13.56 to 100 MHz are applied to a cathode for plasma discharge.

These conditions are selected to avoid sputtering damage to a substrate in case of forming an anode protection film from a metal oxide and the like or carrying out inverse sputtering.

More preferably, power of 50 to 200 W and high-frequency waves of 13.56 to 100 MHz are applied to a helical coil, while power of 200 to 500 W and high-frequency waves of 13.56 to 100 MHz are applied to a cathode for plasma discharge.

(d) Magnetic Field

A magnetic field 16 preferably has a strength of 200 to 300 gauss.

If the strength is less than 200 gauss, a magnetic field required to continue plasma discharge may not be maintained. If it is larger than 300 gauss, the state of sealing plasma may change and therefore uniform discharge may not be maintained dependently on the kind of device.

For these reasons, the strength of magnetic field is preferably from 200 gauss to 300 gauss, more preferably from 230 gauss to 270 gauss.

(e) Sputtering Time

When carrying out the helical sputtering method using an ICMS, sputtering time is preferably from 0.1 minute to 60 minutes.

If the sputtering time is less than 0.1 minute, it may be difficult to control an inverse sputtering processing and suppress sputtering damage. If it exceeds 60 minutes, the processing time may be excessively long.

For these reasons, the sputtering time is preferably from 1 minute to 30 minute, more preferably from 2 minute to 15 minute.

(f) Sputtering Gas

An inert gas 17 used generally such as Ar, Xe and Kr may be preferably used as a sputtering gas.

The sputtering gas pressure is preferably from 0.01 Pa to 3 Pa.

If the sputtering gas pressure is less than 0.01 Pa, it may be difficult to effectively reduce surface defects. If it is higher than 3 Pa, target particles sputtered (FIG. 13, sputtered particles 15) may be damaged by molecules of a sputtering gas, thereby significantly lowering the speed of forming a film by sputtering.

For these reasons, the sputtering gas pressure is preferably from 0.05 Pa to 1 Pa, more preferably from 0.1 Pa to 0.25 Pa.

The flow amount of sputtering gas is preferably from 50 sccm (standard cubic centimeter per minute) to 500 sccm.

If the flow amount of sputtering gas is less than 50 sccm, it may be difficult to effectively remove surface defects. If it is higher than 500 sccm, it may be difficult to control a half band width.

For these reasons, the flow amount of sputtering gas is preferably from 70 sccm to 300 sccm, more preferably from 80 sccm to 250 sccm.

Figure 14:
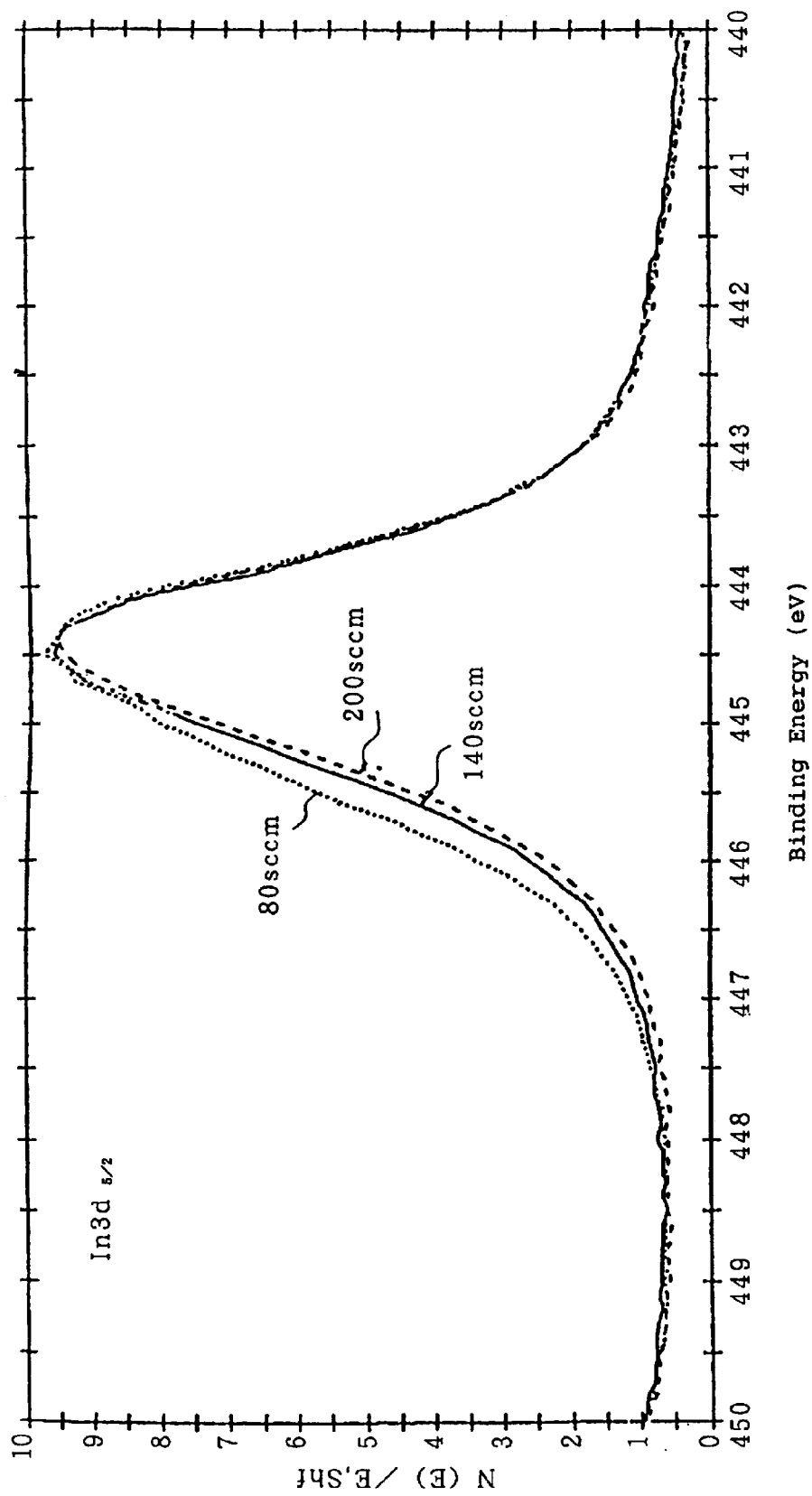
FIG. 14 is a view showing $In3d_{5/2}$ orbit spectral peaks in an ITO surface subjected to inverse sputtering by changing a flow amount of sputtering gas (oxygen partial pressure).

FIG. 14 shows influences on $In3d_{5/2}$ orbit spectral peaks by XPS when changing the flow amount of sputtering gas to 80 sccm, 140 sccm and 200 sccm in inverse sputtering.

It can be understood from these results that the half band width of $In3d_{5/2}$ can be controlled by adjusting the flow amount of sputtering gas in an inverse sputtering.

That is, the half band width of $In3d_{5/2}$ can be controlled by adjusting the flow amount of sputtering gas by properly changing the distance from a substrate, sputtering time, kind of sputtering gas, pressure of sputtering gas, vacuumed pressure and the like.

Figure 15:
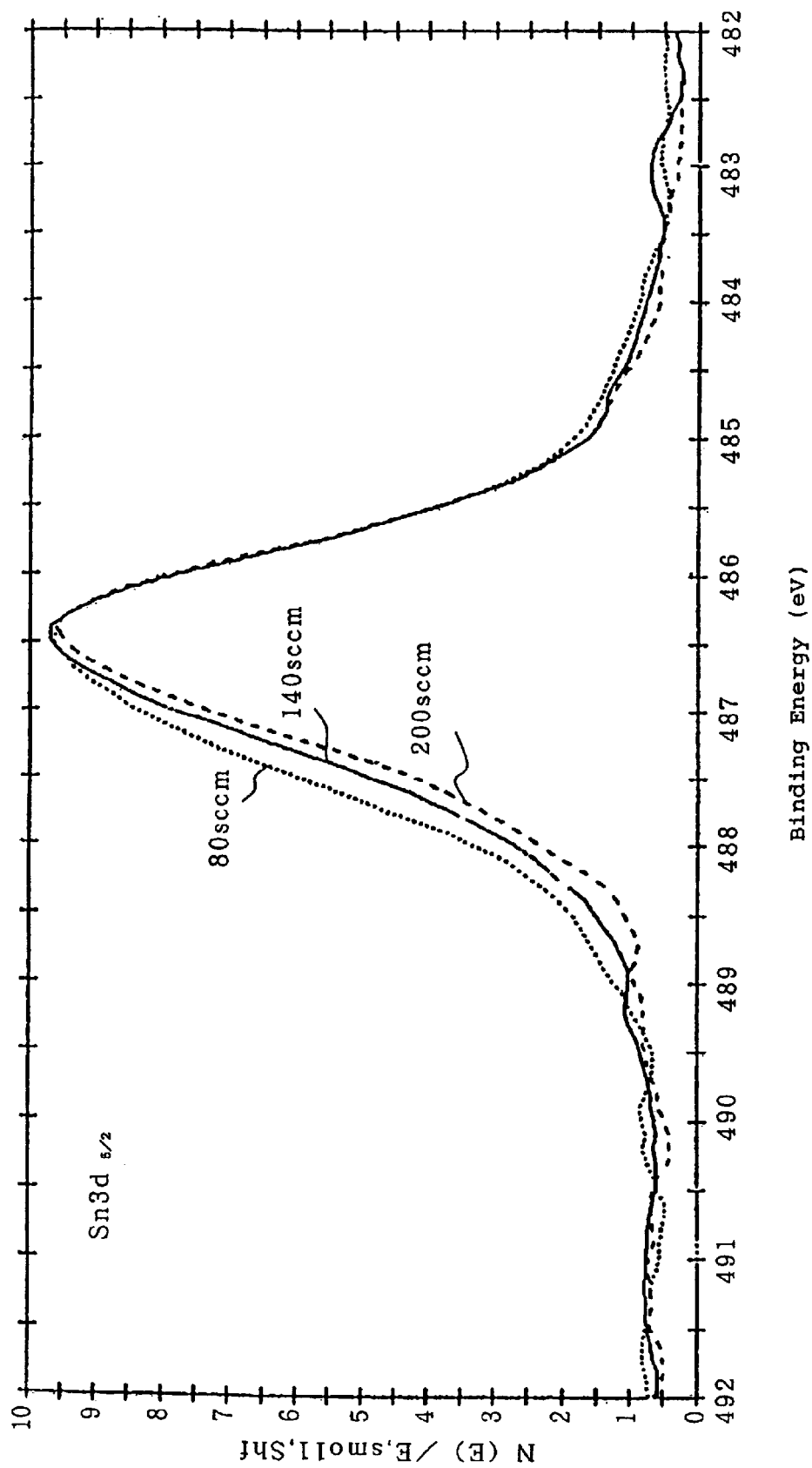
FIG. 15 is a view showing $Sn3d_{5/2}$ orbit spectral peaks in an ITO surface subjected to inverse sputtering by changing a flow amount of sputtering gas (oxygen partial pressure).

FIG. 15 shows influences on $3d_{5/2}$ orbit spectral peaks of Sn when similarly changing the flow amount of sputtering gas in inverse sputtering.

FIG. 16 shows influences on oxygen 1s orbit spectral peaks when similarly changing the flow amount of sputtering gas in inverse sputtering.

In these tests, there is a tendency that larger the flow amount of sputtering gas is, smaller the half band width of each spectral peak is.

(g) Evacuated Pressure

When carrying out the helical sputtering method using an ICMS, an evacuated pressure is preferably from 0.01 Pa to 3 Pa.

If the evacuated pressure is lower than 0.01 Pa, it may be the same as or lower than the under limit for maintenance of discharge, resulting in stop of discharge. If it is higher than 3 Pa, a discharge gas such as rare gases obstructs the arrival of sputtering particles to a substrate, thereby lowering a sputtering speed (speed of forming a film).

For these reasons, the evacuated pressure is preferably from 0.1 Pa to 3 Pa, more preferably from 0.5 Pa to 1.5 Pa.

According to the electrode substrate of the present invention, surface defects can be reduced by improving the electrode itself. Specifically surface defects in the surface of electrode are reduced by associating the composition of electrode surface with that of electrode interior, thereby improving the electrical stability.

Thus when using this electrode substrate, for example, as an anode of an organic EL element, its half time from initial 1,000 nit can be 1700 hours or longer, which means that it is admitted to be used without practical problems, and at this time the increase in driving voltage can be suppressed to 1 V or lower.

According to the electrode substrate of the present invention, the work function of electrode is enhanced and the electrical resistance is made uniform. Thus when using this electrode substrate in organic EL elements and the like, luminescence nonuniformity or brightness variation is not generated, thereby improving the quality and reliability per time of images.

According to the method for producing an electrode substrate of the present invention, such an electrode substrate can be effectively produced.

Thus the electrode substrate of the present invention is suitable as an electrode substrate of display devices such as organic EL elements, inorganic EL elements, liquid-crystal display elements, plasma display elements, portable information devices, portable communicating devices and display device mounted in vehicles. The electrode substrate of the present invention can further improve the quality of images or effectively prevent decrease with time in quality of images.

EXAMPLES

The present invention will be described in detail by Examples directing to the production of electrode substrate and application thereof.

However the present invention is not limited to these Examples.

Example 1

(1) Preparation of Substrate with Anode Thereon

An ITO anode with a thickness of 120 nm was formed on a glass substrate 24 nm long 1.1 mm wide and 1.1 mm thick.

This electrode substrate was subjected to ultrasonic cleaning while immersed sequentially in isopropyl alcohol, purified water and isopropyl alcohol each for 3 minutes.

Next a dry nitrogen gas was blown to the glass substrate to remove organic solvents and the like in a clean room of class 1,000. Thereafter the ITO surface was further cleaned using an UV/ozone cleaning machine.

(a) A $CeO_2$ target and a cleaned substrate with ITO (electrode substrate) was placed in a sputtering chamber. The distance from the target to the substrate with ITO was 30 cm.

(b) Next evacuation was carried out. After the evacuated pressure reached to $2 \times 10^{-4}$ Pa or less, 80 sccm of Ar gas was introduced as a discharge gas by a mass flow controller. At this time, the evacuated pressure was 0.38 Pa.

(c) Next while closing a main shutter just above the target, power of 50 W and high-frequency waves of 13.56 MHz were applied to a helical coil for inductive coupling, while power of 500 W and high-frequency waves of 13.56 MHz were applied to a $CeO_2$ target (cathode), resulting in plasma discharge. At this time the reflection of each coil was 5 W or less.

The plasma discharge was continued for 5 minutes while closing the main shutter so that the surface of $CeO_2$ target was subjected to the sputtering processing.

(d) Next the main shutter was opened and a $CeO_2$ film was formed on the ITO surface for 6 minutes and 10 seconds. As a result, a $CeO_2$ film with a thickness of 20 Å was formed on the ITO.

(e) Next the ITO substrate with the $CeO_2$ layer was removed from the sputtering chamber and then placed in a vacuum vessel of an XPS device.

(f) For the ITO surface and interior (bulk) at the depth of 50 Å from the surface after the sputtering by $Ar^+$ ions, the half band widths of $In3d_{5/2}$ were analyzed.

The analysis showed that the half band width of $In3d_{5/2}$ was 1.90 eV in the surface of $CeO_2$/ITO, while it was 1.71 eV in the ITO interior at the depth of 50 Å. The half band width of $In3d_{5/2}$ was measured through $CeO_2$ in the surface.

It was found that there was no significant deference between the ITO surface and the interior at the depth of 50 Å in ITO composition.

The work function of the surface of ITO/$CeO_2$ film measured by a device (Riken Keiki Co., Ltd., AC-1) was 5.86 eV.

(2) Preparation of Organic EL Element

A blue organic EL element was formed on the electrode substrate with a 20 Å thick $CeO_2$ layer thereon thus obtained in (1) by sequential processes while maintaining vacuum. Specifically, the electrode substrate with a $CeO_2$ layer formed as a surface protection film was accommodated in a vacuum deposition device and thereafter evacuation was carried out to $2 \times 10^{-4}$ Pa or less. Next an organic EL element was prepared under the following conditions:

(a) First Hole Injecting Layer
4,4',4"-tris[N-(3-methylphenyl)-N-phenylamino]-triphenylamine (MTDATA)
Deposition Rate: 0.1 to 0.3 nm/s
Film Thickness: 60 nm (b) Second Hole Injecting Layer
4,4'-tris[N-(3-naphtyl)-N-phenylamino]biphenyl (NPD)
Deposition Rate: 0.1 to 0.3 nm/s
Film Thickness: 20 nm (c) Emitting layer (Host/Dopant)
Film Thickness: 40 nm Host (Emitting material): 4,4'-bis(2,2-diphenylvinyl)-biphenyl (DPVBi)
Deposition Rate: 0.4 nm/s
Dopant: 4,4'-bis(2-(4-(N,N-di-p-tolyl)plenyl)vinyl)-biphenyl (DTAVBi)
Deposition Rate: 0.01 nm/s
Dopant Concentration: 2.5 wt %

(d) Electron Transporting Layer
Tris(8-quinolynol)aluminum (Alq)
Deposition Rate: 0.1 to 0.3 nm/s
Film Thickness: 20 nm (e) Cathode
Al/Li Alloy (Li concentration, 10 at %)
Deposition Rate: 0.5 to 1.0 nm/s
Film Thickness: 150 nm (3) Evaluation of Organic EL Element When a direct current of 5V was applied to the organic EL element using the electrode substrate of the present invention thus prepared, the current value was 5.12 mA/$cm^2$ and its luminous brightness was 423 nit. The power-conversion efficiency was 5.19 lm/W. A dark spot (DS) was not visually observed in an emitting area of 4×8 mm and uniform emitting was observed.

The organic EL element was driven by a constant direct current with an initial brightness of 1,000 nit. The half time during which its brightness was reduced by half was 2,550 hours. The voltage increased by 0.53 V for this period. These results are shown in Tables 1 and 2.

TABLE 1

|  | Surface Processing | Surface Protection Layer | $(3d_{5/2})_h$ | $(3d_{5/2})_n$ | Ratio of Half Band Width | Ratio of Area $S_B/S_A$ |
|---|---|---|---|---|---|---|
| Example 1 | None | $CeO_2$ 20A | 1.90 | 1.71 | 1.11 | — |
| Example 2 | ICMS | $CeO_2$ 20A | 2.01 | 1.71 | 1.18 | — |
| Example 3 | ICMS | $CeO_2$ 20A | 1.90 | 1.75 | 1.09 | 0.18 |
| Comparative Example 1 | None | — | 2.32 | 1.71 | 1.36 | 1.25 |
| Comparative Example 2 | Electron Beam | $SiO_2$ 20A | 2.13 | 1.72 | 1.25 | — |
| Comparative Example 3 | None | — | 2.25 | 1.71 | 1.32 | — |
| Comparative Example 4 | None | — | 2.45 | 1.75 | 1.40 | 1.30 |
| Comparative Example 5 | Electron Beam | $SiO_2$ 20A | 2.20 | 1.75 | 1.26 | — |

TABLE 2

|  | Current Density (mA/$cm^2$) | Luminous Brightness (nit) | Luminous Efficiency (lm/W) | DS | Half Time (Hrs) | Voltage Increase (V) |
|---|---|---|---|---|---|---|
| Example 1 | 5.12 | 423 | 5.19 | None | 2550 | 0.53 |
| Example 2 | 5.08 | 456 | 5.63 | None | 2500 | 0.68 |
| Example 3 | 5.31 | 470 | 5.56 | None | 2100 | 0.38 |
| Comparative Example 1 | 4.20 | 380 | 4.74 | None | 1350 | 3.35 |
| Comparative Example 2 | 4.18 | 380 | 4.75 | None | 1800 | 1.52 |
| Comparative Example 3 | 3.20 | 266 | 4.35 | None | 800 | 3.50 |
| Comparative | 4.23 | 368 | 4.55 | None | 1010 | 3.51 |

TABLE 2-continued

|  | Current Density (mA/cm$^2$) | Luminous Brightness (nit) | Luminous Efficiency (lm/W) | DS | Half Time (Hrs) | Voltage Increase (V) |
| --- | --- | --- | --- | --- | --- | --- |
| Example 4 Comparative Example 5 | 4.24 | 372 | 4.59 | None | 1510 | 1.56 |

Comparative Example 1

(1) Preparation of Substrate with Anode Thereon

An ITO substrate was prepared, which substrate was the same as that prepared in Example 1 except that a CeO$_2$ layer was not formed as a surface protection layer and the inverse sputtering was not performed.

That is, the electrode substrate was subjected to wet cleaning by organic solvents and UV/O$_3$ cleaning like Example 3, but thereafter placed in a vacuum vessel for XPS without the formation of a CeO$_2$ layer and performance of inverse sputtering. The half band widths of ITO surface and interior at the depth of 50 Å were then measured.

As a result, the half band width of In3d$_{5/2}$ was 2.32 eV in the surface of substrate, while it was 1.71 eV in the ITO interior at the depth of 50 Å. It was found that there was a significant deference between the surface and the interior in ITO composition.

Therefore it is predicted that an ITO substrate that has been subjected to only ordinary cleaning has many surface defects.

The work function of the surface of ITO substrate measured by a device (Riken Keiki Co., Ltd., AC-1) was 5.02 eV.

(2) Preparation of Organic EL Element

An organic EL element was prepared using the ITO substrate obtained in (1) in a similar way to Example 1.

(3) Evaluation of Organic EL Element

When a direct current of 6V was applied to the organic EL element prepared in (2), the current value was 4.20 mA/cm$^2$ and its luminous brightness was 380 nit. The power-conversion efficiency was 4.74 lm/W. A dark spot was not visually observed in an emitting area of 4×8 mm.

The organic EL element was driven by a constant direct current under the condition of a 1,000 nit initial brightness. The half time was 1,350 hours. The voltage increased by 3.35 V for this period.

It was confirmed that the half time at the time of constant-direct-current driving was short and increase in voltage was large. It seems to be caused by the surface defects existing on the ITO surface.

Comparative Example 2

(1) Preparation of Substrate with Anode Thereon (ITO Substrate)

A SiO$_2$ film was formed by electron beam deposition in place of the CeO$_2$ film in Example 1.

Specifically the film was formed by the following steps:

(a) An ITO substrate was placed in a vacuum chamber. An electron beam deposition source EGK-3M made by Nihon Shinku Kaisha (ULVAC, Inc) was mounted and a SiO$_2$ pellet was then placed.

(b) Vacuum evacuation was carried out to 2×10$^{-4}$ Pa. For the SiO$_2$ pellet, a current was gradually increasingly applied to a filament to effect degassing. A shutter closer to the substrate (main shutter) was closed and the evacuated pressure was maintained to be about 1×10$^{-4}$ Pa for this period.

(c) Next voltage for accelerating an electron beam was adjusted to 5 kV and the deposition rate of SiO$_2$ film was controlled. Specifically a current was increased until the deposition rate determined by a film-thickness-measuring device of quartz oscillation type became 0.1 Å/s, and maintained for 3 minutes, thereby stabilizing the deposition rate.

(d) Next the main shutter was opened and a SiO$_2$ film was deposited by an electron beam on the ITO substrate to a 20 Å thickness.

For the substrate thus prepared, half band widths of In3d$_{5/2}$ spectral peaks were measured in the ITP surface and interior at the depth of 50 Å like Example 1.

As a result, the half band width of In3d$_{5/2}$ spectral peak was 2.13 eV in the surface of substrate, while it was 1.72 eV in the ITO interior at the depth of 50 Å.

Therefore it was found that there were surface defects on the ITO surface of substrate on which the SiO$_2$ film of 20 Å thickness was formed by electron beam deposition and the surface and the interior were different in ITO composition.

The work function of the ITO/SiO$_2$ surface measured by a device (Riken Keiki Co., Ltd., AC-1) was 4.98 eV.

(2) Preparation of Organic EL Element

An organic EL element was prepared using the ITO substrate obtained in (1) in a similar way to Example 1.

(3) Evaluation of Organic EL Element

The organic EL element obtained in (2) was driven by a constant direct current under the condition of a 1,000 nit initial brightness to measure its half time and voltage increase like Example 1.

As a result, when a direct current of 6V was applied to the organic EL element with the 20 Å thick SiO$_2$ film formed by electron beam deposition, a current of 4.18 mA/cm$^2$ passed and blue emission of a 380 nit brightness was observed. Thus the initial properties were substantially the same as those of Example 1 and Comparative Example 2.

A dark spot was not visually observed in an emitting area and the emission was uniform. These results are shown in Table 1.

Apparently from the results, the half time of organic EL element was 1,800 hours and the voltage increased by 1.52 V for this period.

It was confirmed that the half time at the time of constant-direct-current driving was short and increase in voltage was large. It seems to be caused by that electron beam deposition could not effectively remove surface defects.

Example 2

(1) Preparation of ITO Substrate and Organic EL Element

An organic EL element was formed under the same conditions as Example 1 except that the 60 nm thick first hole injecting layer was formed by using NPD in place of MTDATA.

(2) Evaluation of Organic EL Element

When a direct current of 5 V was applied to the organic EL element prepared, a current of 5.08 mA/cm$^2$ passed, the power-conversion efficiency was 5.63 lm/W and blue emission of a 456 nit brightness was observed. A dark spot was not visually observed in an emitting area.

Next the organic EL element was driven by a constant direct current under the initial condition of 1,000 nit to measure its half time and voltage increase.

As a result, the half time was 2,500 hours and the voltage increased by 0.68 V for this period.

Apparently from the results, it was confirmed that the half time at the time of constant-direct-current driving was as long as 2500 hours and the increase in voltage was as small as 0.7 V. It seems to be caused by effective removal of surface defects.

Comparative Example 3

(1) Preparation of ITO Substrate and Organic EL Element

A commercially available ITO substrate was prepared. After the substrate had been subjected to only cleaning shown in Comparative Example 2, an organic EL element was formed like Example 2.

(2) Evaluation of Organic EL Element

When a direct current of 6 V was applied to the organic EL element prepared, a current of 3.20 mA/cm² passed, the power-conversion efficiency was 4.35 lm/W and blue emission of a 266 nit brightness was observed. A dark spot was not visually observed in an emitting area.

Next the organic EL element was driven by a constant direct current under the initial condition of 1,000 nit to measure its half time and voltage increase.

As a result, the half time was 800 hours and the voltage increased by 3.50 V for this period.

Apparently from the results, it was confirmed that the half time at the time of constant-direct-current driving was as short as 1,000 hours or less and the increase in voltage exceeds 3 V. It seems to be caused by no removal of surface defects.

Example 3

(1) Preparation of Substrate with Anode (IZO Substrate)

A 200 nm thick IZO layer was formed on a substrate of the same size as that of Example 1. This substrate was cleaned, the IZO (electrode) surface of electrode substrate was subjected to inverse sputtering by an inductively coupled RF plasma sputtering magnetron sputtering device 10 shown in FIG. 13, and a 20 Å thick $CeO_2$ film was formed as a surface protection film in the same way as the embodiment of production method. Specifically the film was formed by the steps of Example 1.

The work function of the surface of $IZO/CeO_2$ film measured by a device (Riken Keiki Co., Ltd., AC-1) was 6.12 eV.

An organic EL element was then formed using the IZO substrate like Example 1.

(2) Evaluation of Organic EL Element

The organic EL element prepared in (1) was tested for emission (application of DC 5 V), and its half time and voltage increase were measured when continuously driven by a constant direct current under the initial condition of 1,000 nit. These results are shown in Table 2.

Apparently from the results, it was confirmed that the half time was as long as 2,000 hours or more and the increase in voltage was as small as 0.4 V or less like Example 1.

Comparative Example 4

(1) Preparation of Substrate with Anode Thereon (IZO Substrate)

An IZO substrate was prepared similarly to Example 3 except that a $CeO_2$ was not formed as a surface protection film and the inverse sputtering was not performed. The work function of the surface of IZO film measured by a device (Riken Keiki Co., Ltd., AC-1) was 5.11 eV. An organic EL element was formed using the IZO substrate like Example 1.

(2) Evaluation of Organic EL Element

The organic EL element prepared in (1) was tested for emission (application of DC 6 V), and its half time and voltage increase were measured when continuously driven by a constant direct current under the initial condition of 1,000 nit. These results are shown in Table 2.

As a result, the half time was 1,010 hours and the voltage increased by 3.51 V for this period.

Apparently from the results, it was confirmed that the half time was as short as 1,000 hours or less and the increase in voltage exceeded 3 V. It seems to be caused by no removal of surface defects.

Comparative Example 5

(1) Preparation of Substrate with Anode Thereon (IZO Substrate)

A 20 Å thick $SiO_2$ film was formed by electron beam deposition instead of the $CeO_2$ layer formed by a helical sputtering method in Example 3. The work function of the surface of $IZO/SiO_2$ film measured by a device (Riken Keiki Co., Ltd., AC-1) was 4.94 eV.

An organic EL element was formed using the IZO substrate like Example 1.

(2) Evaluation of Organic EL Element

The organic EL element prepared in (1) was tested for emission (application of DC 6 V), and its half time and voltage increase were measured when continuously driven by a constant direct current under the initial condition of 1,000 nit. These results are shown in Table 2.

As a result, the half time was 1,510 hours and the voltage increased by 1.56 V for this period.

Apparently from the results, it was confirmed that the half time was as short as 500 hours or less and the increase in voltage exceeded 1.5 V. It seemed to be caused by no removal of surface defects.

We claim:

1. An electrode substrate comprising;
    an electrode comprising a compound containing an In atom and
    a substrate body,
    wherein a half band width ratio $[In3d_{5/2}]_h/[In3d_{5/2}]_n$ is from 0.9 to 1.2 wherein $[In3d_{5/2}]_h$ is a half band width of a $3d_{5/2}$ orbit spectral peak of an In atom in the surface of the electrode, and $[In3d_{5/2}]_n$ is a half band width of a $3d_{5/2}$ orbit spectral peak of an In atom in the interior of the electrode, the spectral peaks being measured by X-ray photoelectron spectroscopy.

2. The electrode substrate according to claim 1, wherein an area ratio $S_B/S_A$ satisfies the following formula:

$$S_B/S_A < 0.3$$

wherein $S_A$ is the area of a peak A that is a peak of an oxygen 1s orbit with a binding energy of 530±0.5 eV in the surface of the electrode and $S_B$ is the area of a peak B that is a peak of an oxygen 1s orbit with a binding energy of 532±1.0 eV in the surface of the electrode, the peaks being measured by X-ray photoelectron spectroscopy.

3. The electrode substrate according to claim 1, wherein a constituent material of the substrate body and/or the electrode is a transparent material.

4. The electrode substrate according to claim 1, wherein a surface protection film comprising an inorganic compound is formed on the surface of the electrode.

5. The electrode substrate according to claim 4, wherein the inorganic compound forming the surface protection film is an oxide containing a Ce atom.

6. The electrode substrate according to claim 4, wherein the thickness of the surface protection film is from 5 Å to 100 Å.

7. The electrode substrate according to claim 1, wherein the surface of the electrode is subjected to inverse sputtering.

8. The electrode substrate according to claim 7, wherein the inverse sputtering is carried out by inductively coupled RF plasma sputtering magnetron sputtering.

9. The electrode substrate according to claim 1, wherein the electrode comprises indium tin oxide (ITO) or indium zinc oxide (IZO).

10. The electrode substrate according to claim 1, wherein the electrode comprises an amorphous oxide.

11. A method for producing an electrode substrate comprising a substrate body and an electrode comprising the steps of:

forming an electrode comprising an indium atom containing compound on a substrate body, and giving an inorganic compound to the surface of electrode formed; wherein a half band width ratio $[In3d_{5/2}]_h / [In3d_{5/2}]_n$ is from 0.9 to 1.2 wherein $In3d_{5/2}]_h$ is a half band width of a $3d_{5/2}$ orbit spectral peak of an In atom in the surface of the electrode, and $[In3d_{5/2}]_n$ is a half band width of a $3d_{5/2}$ orbit spectral peak of an In atom in the interior of the electrode, the spectral peaks being measured by X-ray photoelectron spectroscopy.

12. The method according to claim 11, wherein a surface protection film comprising an inorganic compound is formed after or at the time when the surface of the electrode is subjected to inverse sputtering in the step of giving the inorganic compound to the surface of the electrode.

13. The method according to claim 12, wherein the inverse sputtering is carried out by inductively coupled RF plasma sputtering magnetron sputtering.

14. The method according to claim 13, wherein the inverse sputtering is carried out by applying power of 50 to 200 W and high-frequency waves of 13.56 to 100 MHz to a helical coil, applying power of 200 to 500 W and high-frequency waves of 13.56 to 100 MHz to a cathode for plasma discharge and making the strength of a magnetic field range from 200 to 300 gauss.

* * * * *